(12) United States Patent
Zhang et al.

(10) Patent No.: US 12,047,824 B2
(45) Date of Patent: Jul. 23, 2024

(54) METHOD AND DEVICE FOR DETERMINING MRO CRITICAL SCENARIO, AND APPARATUS

(71) Applicant: DATANG MOBILE COMMUNICATIONS EQUIPMENT CO., LTD., Beijing (CN)

(72) Inventors: Mingzhu Zhang, Beijing (CN); Jiangsheng Fan, Beijing (CN); Nan Yan, Beijing (CN); Ye Zhou, Beijing (CN); Ruiwei Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/249,947

(22) PCT Filed: Oct. 11, 2021

(86) PCT No.: PCT/CN2021/123064
§ 371 (c)(1),
(2) Date: Apr. 20, 2023

(87) PCT Pub. No.: WO2022/083469
PCT Pub. Date: Apr. 28, 2022

(65) Prior Publication Data
US 2023/0328603 A1    Oct. 12, 2023

(30) Foreign Application Priority Data

Oct. 20, 2020  (CN) .......................... 202011127079.6
Jan. 11, 2021  (CN) .......................... 202110033689.8

(51) Int. Cl.
H04W 36/00    (2009.01)
H04W 36/08    (2009.01)
H04W 36/30    (2009.01)

(52) U.S. Cl.
CPC ....... H04W 36/0079 (2018.08); H04W 36/08 (2013.01); H04W 36/305 (2018.08)

(58) Field of Classification Search
CPC ............. H04W 36/0079; H04W 36/08; H04W 36/083; H04W 36/085; H04W 36/087; H04W 36/13; H04W 36/305
See application file for complete search history.

(56) References Cited

U.S. PATENT DOCUMENTS

2013/0316713 A1    11/2013  Xu et al.
2017/0251409 A1     8/2017  Wegmann et al.
(Continued)

FOREIGN PATENT DOCUMENTS

CN    107666672 A    2/2018
CN    112399454 A    2/2021
(Continued)

OTHER PUBLICATIONS

CATT ("RLF report definition based on MRO stage-2 solution", 3GPP TSG-RAN WG3 Meeting #65bis, R3-092233, Oct. 12-15, 2009) (Year: 2009).*

(Continued)

Primary Examiner — Chi H Pham
Assistant Examiner — Ji-Hae Yea
(74) Attorney, Agent, or Firm — Ladas & Parry, LLP

(57) ABSTRACT

A method and a device for determining an MRO critical scenario and an apparatus are provided. The method includes: obtaining, by the UE, parameter information about a connection problem in the case that the connection problem has been detected by the UE in a cell handover process and cell handover has been performed successfully, or in the case that the connection problem has been detected by the UE within a predetermined time period after the cell handover is performed successfully; and transmitting, by the (Continued)

UE, the parameter information to a network device, so that the network device may determine the MRO critical scenario in accordance with the parameter information. According to the embodiments of the present disclosure, it is able to determine the MRO critical scenario in a scenario where cell handover is performed successfully.

20 Claims, 6 Drawing Sheets

(56) References Cited

U.S. PATENT DOCUMENTS

| | | | |
|---|---|---|---|
| 2020/0314716 A1* | 10/2020 | Kim | H04W 36/0079 |
| 2021/0377831 A1 | 12/2021 | Yan et al. | |
| 2021/0400549 A1* | 12/2021 | Awada | H04W 36/18 |
| 2022/0014987 A1 | 1/2022 | Fujishiro | |
| 2022/0141725 A1* | 5/2022 | Parichehrehteroujeni | H04W 36/0058 370/331 |
| 2022/0330126 A1 | 10/2022 | Yan et al. | |

FOREIGN PATENT DOCUMENTS

| | | |
|---|---|---|
| JP | 2017508404 A | 3/2017 |
| JP | 2019195220 A | 11/2019 |
| WO | 2020063834 A1 | 4/2020 |
| WO | 2020164365 A1 | 8/2020 |
| WO | 2020167237 A1 | 8/2020 |
| WO | 2020196124 A1 | 10/2020 |
| WO | 2020197480 A1 | 10/2020 |

OTHER PUBLICATIONS

International Search Report for International Application No. PCT/CN2021/123064 issued on Jan. 17, 2022, with English translation provided by WIPO.

Written Opinion of the International Searching Authority for International Application No. PCT/CN2021/123064 issued on Jan. 17, 2022, with machine translation provided by WIPO.

First Office Action and search report in corresponding Chinese Application No. 202110033689.8, issued on Dec. 28, 2022.

"RLF report definition based on MRO stage-2 solution," 3GPP TSG-RAN WG3 Meeting #65bis, R3-092233, Oct. 2009, source: CATT.

Extended search report from corresponding European Patent Application No. 21881887.0 dated Mar. 18, 2024.

Huawei et al: "Discussion for RAN2 SON scope and requirements", 3GPP Draft; R2-2007769, 3rd Generation Partnership Project (3GPP), Mobile Competence Centre; 650, Route Des Lucioles; F-06921 Sophia-Antipolis Cedex; France, vol. RAN WG2, no. electronic; Aug. 17, 2020-Aug. 28, 2020 Aug. 7, 2020 (Aug. 7, 2020), XP051912395.

3rd Generation Partnership Project; Technical Specification Group Radio Access Network; NR; NR and NG-RAN Overall Description; Stage 2 (Release 16), 3GPP Draft; Draft_38300-G30, 3rd Generation Partnership Project (3GPP), Mobile Competence Centre; 650, Route Des Lucioles; F-06921 Sophia-Antipolis Cedex; France, Sep. 30, 2020 (Sep. 30, 2020), XP051936828.

Office action from corresponding Japanese Patent Application No. 2023-524359 dated Jan. 30, 2024.

* cited by examiner

METHOD AND DEVICE FOR DETERMINING MRO CRITICAL SCENARIO, AND APPARATUS

CROSS-REFERENCE TO RELATED APPLICATIONS

This application is the U.S. national phase of PCT Application No. PCT/CN2021/123064 filed on Oct. 11, 2021, which claims priorities of the Chinese patent application No. 202011127079.6 filed with the China Patent Office on Oct. 20, 2020 and entitled "method and device for determining MRO critical scenario, and apparatus", and the Chinese patent application No. 202110033689.8 filed with the China Patent Office on Jan. 11, 2021 and entitled "method and device for determining MRO critical scenario, and apparatus", the disclosures of which are incorporated herein by reference in their entireties.

TECHNICAL FIELD

The present disclosure relates to the field of mobile communication technology, in particular to a method and a device for determining a Mobility Robustness Optimization (MRO) critical scenario, and an apparatus.

BACKGROUND

The MRO includes detection of a too late handover scenario, a too early handover scenario and a handover to wrong cell scenario, and adjustment of parameters in accordance with a detection result, so as to reduce a Handover Failure (HOF) or a handover-related Radio Link Failure (RLF).

Hence, one of the known MRO functions is to determine a connection failure to the too late handover, the too early handover and the handover to wrong cell. It is found that, a connection problem also occurs in the case of successful handover, but no connection failure occurs, i.e., there is a critical situation for the too late handover, the too early handover and the handover to wrong cell. However, for the known MRO function, there is currently no method for determining such a critical scenario.

SUMMARY

Embodiments of the present disclosure provide a method and a device for determining an MRO critical scenario, and an apparatus, so as to determine the MRO critical scenario in the case of successful cell handover.

In one aspect, the present disclosure provides in some embodiments a method for determining an MRO critical scenario for a User Equipment (UE), including: obtaining parameter information about a connection problem in the case that the connection problem has been detected by the UE in a cell handover process and cell handover has been performed successfully, or in the case that the connection problem has been detected by the UE within a predetermined time period after the cell handover is performed successfully; and transmitting the parameter information to a network device, so that the network device may determine the MRO critical scenario in accordance with the parameter information.

Optionally, the parameter information includes at least one of: content information about the connection problem; location information about a location of the UE when the connection problem is detected by the UE; identification information about a source cell and identification information about a target cell; identification information about a cell to which the UE is instructed by a first handover command to hand over, the first handover command being transmitted by the target cell to the UE; or identification information about a cell where the connection problem occurs.

Optionally, when the connection problem occurs at the UE and a cell serving the UE belongs to a $5^{th}$-Generation (5G) Integrated Access and Backhaul (IAB) node, the parameter information includes first indication information, and the first indication information is used to indicate that the connection problem occurs at the 5G IAB node or the connection problem is a backhaul connection problem.

Optionally, the connection problem includes that an RLF occurs between the UE and the source cell in a Dual Active Protocol Stack (DAPS) handover scenario after a second handover command has been received by the UE, the parameter information includes second indication information, the second handover command is transmitted by the source cell and used to instruct the UE to hand over to the target cell, and the second indication information is used to indicate that the RLF occurs between the UE and the source cell.

Optionally, the connection problem includes at least one of: that a T310 timer is started and not expired; that a T312 timer is started and not expired; that the quantity of times of transmitting an MSGA in a random access process is greater than 1 and smaller than a first predetermined value, the MSGA being a message transmitted by the UE in a two-step random access process; that the quantity of times of transmitting an random access preamble sequence in the random access process is greater than 1 and smaller than a second predetermined value; that the random access process is successfully triggered by a beam failure recovery process; that a Radio Link Control (RLC) protocol is retransmitted and the quantity of times of retransmitting the RLC protocol is smaller than a third predetermined value; or that a Media Access Control (MAC) layer has received a bottom-layer Listen Before Talk (LBT) failure indication, and the quantity of times of continuously receiving the LBT failure indication is smaller than a fourth predetermined value.

Optionally, the parameter information includes a duration of a connection problem timer, and the duration of the connection problem timer is a duration from a time point when last handover initialization is performed by the UE to a time point when the connection problem is detected, or a duration from the time point when the last handover initialization is performed by the UE to a time point when the connection problem is ended.

Optionally, the parameter information further includes at least one of: content information about the connection problem; location information about a location of the UE when the connection problem is detected by the UE by the UE; identification information about a source cell and identification information about a target cell; identification information about a cell to which the UE is instructed by a first handover command to hand over, the first handover command being transmitted by the target cell to the UE; or identification information about a cell where the connection problem occurs.

Optionally, in a conditional handover scenario or a DAPS handover scenario, a connection problem timer is set for each cell, and the cell is a source cell or a target cell in the cell handover process. In the case that the connection problem is a connection problem between the UE and the source cell, the duration of the connection problem timer in the parameter information is a duration of the connection problem timer set for the source cell. In the case that the connection problem is a connection problem between the UE and the target cell, the duration of the connection problem timer in the parameter information is a duration of the connection problem timer set for the target cell. The duration of the connection problem timer set for the source cell is a duration from a time point when last handover initialization is performed by the UE in the source cell to a time point when the connection problem is detected, or a duration from the time point when the last handover initialization is performed by the UE in the source cell to a time point when the connection problem is ended. The duration of the connection problem timer set for the target cell is a duration from a time point when last handover initialization is performed by the UE in the target cell to the time point when the connection problem is detected, or a duration from the time point when the last handover initialization is performed by the UE in the target cell to the time point when the connection problem is ended.

Optionally, the connection problem further includes that an RLF occurs between the UE and the source cell after a second handover command has been received by the UE in a DAPS handover scenario, the parameter information further includes second indication information, the second handover command is a handover command transmitted by the source cell for indicating the UE to hand over to the target cell, and the second indication information is used to indicate that the RLF occurs between the UE and the source cell.

In another aspect, the present disclosure provides in some embodiments a method for determining an MRO critical scenario for a network device, including: receiving parameter information about a connection problem transmitted by a UE, the parameter information being obtained in the case that the connection problem has been detected by the UE in a cell handover process and cell handover has been performed successfully, or in the case that the connection problem has been detected by the UE within a predetermined time period after the cell handover is performed successfully; and determining the MRO critical scenario in accordance with the parameter information, and obtaining a determination result of the MRO critical scenario.

Optionally, the parameter information includes at least one of: content information about the connection problem; location information about a location of the UE when the connection problem is detected by the UE; identification information about a source cell and identification information about a target cell; identification information about a cell to which the UE is instructed by a first handover command to hand over, the first handover command being transmitted by the target cell to the UE; or identification information about a cell where the connection problem occurs.

Optionally, the connection problem includes that an RLF occurs between the UE and the source cell after a second handover command has been received by the UE in a DAPS handover scenario, the parameter information includes second indication information, the second handover command is transmitted by the source cell and used to instruct the UE to hand over to the target cell, and the second indication information is used to indicate that the RLF occurs between the UE and the source cell.

Optionally, the connection problem includes at least one of: that a T310 timer is started and not expired; that a T312 timer is started and not expired; that the quantity of times of transmitting an MSGA in a random access process is greater than 1 and smaller than a first predetermined value, the MSGA being a message transmitted by the UE in a two-step random access process; that the quantity of times of transmitting an random access preamble sequence in the random access process is greater than 1 and smaller than a second predetermined value; that the random access process is successfully triggered by a beam failure recovery process; that an RLC protocol is retransmitted and the quantity of times of retransmitting the RLC protocol is smaller than a third predetermined value; or that an MAC layer has received a bottom-layer LBT failure indication, and the quantity of times of continuously receiving the LBT failure indication is smaller than a fourth predetermined value.

Optionally, when the connection problem occurs at the UE and a cell serving the UE belongs to a 5G IAB node, the parameter information includes first indication information, and the first indication information is used to indicate that the connection problem occurs at the 5G IAB node or the connection problem is a backhaul connection problem. The method further includes determining that the connection problem occurs at the 5G IAB node or the connection problem is the backhaul connection problem in accordance with the first indication information.

Optionally, the parameter information includes a duration of a connection problem timer, and the duration of the connection problem timer is a duration from a time point when last handover initialization is performed by the UE to a time point when the connection problem is detected, or a duration from the time point when the last handover initialization is performed by the UE to a time point when the connection problem is ended.

Optionally, the parameter information further includes at least one of: content information about the connection problem; location information about a location of the UE when the connection problem is detected by the UE by the UE; identification information about a source cell and identification information about a target cell; identification information about a cell to which the UE is instructed by a first handover command to hand over, the first handover command being transmitted by the target cell to the UE; or identification information about a cell where the connection problem occurs.

Optionally, in a conditional handover scenario or a DAPS handover scenario, a connection problem timer is set for each cell, and the cell is a source cell or a target cell in the cell handover process. In the case that the connection problem is a connection problem between the UE and the source cell, the duration of the connection problem timer in the parameter information is a duration of the connection problem timer set for the source cell. In the case that the connection problem is a connection problem between the UE and the target cell, the duration of the connection problem timer in the parameter information is a duration of the connection problem timer set for the target cell. The duration of the connection problem timer set for the source cell is a duration from a time point when last handover initialization is performed by the UE in the source cell to a time point when the connection problem is detected, or a duration from the time point when the last handover initialization is performed by the UE in the source cell to a time point when the connection problem is ended. The duration of the connection problem timer set for the target cell is a duration from a time point when last handover initialization is performed by the UE in the target cell to the time point when the connection problem is detected, or a duration from the time point when the last handover initialization is performed by the UE in the target cell to the time point when the connection problem is ended.

Optionally, the connection problem further includes that an RLF occurs between the UE and the source cell after a second handover command has been received by the UE in a DAPS handover scenario, the parameter information further includes second indication information, the second handover command is a handover command transmitted by the source cell for indicating the UE to hand over to the target cell, and the second indication information is used to indicate that the RLF occurs between the UE and the source cell.

Optionally, the network device is a cell where the connection problem occurs; or when the network device is not the cell where the connection problem occurs, the method further includes transmitting the parameter information to the cell where the connection problem occurs.

Optionally, the MRO critical scenario is at least one of an inter-system too late handover critical scenario, an inter-system too early handover critical scenario, an inter-system handover to wrong cell critical scenario, an intra-system too late handover critical scenario, or an intra-system too early handover critical scenario.

Optionally, in the case that the MRO critical scenario is one of the intra-system too early handover critical scenario or the inter-system too early handover critical scenario, the method further includes transmitting the determination result of the MRO critical scenario and the parameter information to a cell where a parameter needs to be adjusted.

Optionally, in the case that the MRO critical scenario is the intra-system handover to wrong cell critical scenario, the method further includes transmitting the determination result of the MRO critical scenario, the parameter information and identification information about a cell to which the UE is instructed by a first handover command to hand over to a cell where a parameter needs to be adjusted. The first handover command is a handover command transmitted by the target cell to the UE.

In yet another aspect, the present disclosure provides in some embodiments a UE, including a memory, a transceiver and a processor. The memory is configured to store therein a computer program. The transceiver is configured to transmit and receive data under the control of the processor. The processor is configured to read the computer program in the memory, so as to: obtain parameter information about a connection problem in the case that the connection problem has been detected by the UE in a cell handover process and cell handover has been performed successfully, or in the case that the connection problem has been detected by the UE within a predetermined time period after the cell handover is performed successfully; and control the transceiver to transmit the parameter information to a network device, so that the network device may determine the MRO critical scenario in accordance with the parameter information.

Optionally, the parameter information includes at least one of: content information about the connection problem; location information about a location of the UE when the connection problem is detected by the UE; identification information about a source cell and identification information about a target cell; identification information about a cell to which the UE is instructed by a first handover command to hand over, the first handover command being transmitted by the target cell to the UE; or identification information about a cell where the connection problem occurs.

Optionally, the connection problem includes that an RLF occurs between the UE and the source cell after a second handover command has been received by the UE in a DAPS handover scenario, the parameter information includes second indication information, the second handover command is transmitted by the source cell and used to instruct the UE to hand over to the target cell, and the second indication information is used to indicate that the RLF occurs between the UE and the source cell.

Optionally, the connection problem includes at least one of: that a T310 timer is started and not expired; that a T312 timer is started and not expired; that the quantity of times of transmitting an MSGA in a random access process is greater than 1 and smaller than a first predetermined value, the MSGA being a message transmitted by the UE in a two-step random access process; that the quantity of times of transmitting an random access preamble sequence in the random access process is greater than 1 and smaller than a second predetermined value; that the random access process is successfully triggered by a beam failure recovery process; that an RLC protocol is retransmitted and the quantity of times of retransmitting the RLC protocol is smaller than a third predetermined value; or that an MAC layer has received a bottom-layer LBT failure indication, and the quantity of times of continuously receiving the LBT failure indication is smaller than a fourth predetermined value.

Optionally, the parameter information includes a duration of a connection problem timer, and the duration of the connection problem timer is a duration from a time point when last handover initialization is performed by the UE to a time point when the connection problem is detected, or a duration from the time point when the last handover initialization is performed by the UE to a time point when the connection problem is ended.

Optionally, the parameter information further includes at least one of: content information about the connection problem; location information about a location of the UE when the connection problem is detected by the UE by the UE; identification information about a source cell and identification information about a target cell; identification information about a cell to which the UE is instructed by a first handover command to hand over, the first handover command being transmitted by the target cell to the UE; or identification information about a cell where the connection problem occurs.

Optionally, in a conditional handover scenario or a DAPS handover scenario, a connection problem timer is set for each cell, and the cell is a source cell or a target cell in the cell handover process. In the case that the connection problem is a connection problem between the UE and the source cell, the duration of the connection problem timer in the parameter information is a duration of the connection problem timer set for the source cell. In the case that the connection problem is a connection problem between the UE and the target cell, the duration of the connection problem timer in the parameter information is a duration of the connection problem timer set for the target cell. The duration of the connection problem timer set for the source cell is a duration from a time point when last handover initialization is performed by the UE in the source cell to a time point when the connection problem is detected, or a duration from the time point when the last handover initialization is performed by the UE in the source cell to a time point when the connection problem is ended. The duration of the connection problem timer set for the target cell is a duration from a time point when last handover initialization is performed by the UE in the target cell to the time point when the connection problem is detected, or a duration from the time point when the last handover initialization is performed by the UE in the target cell to the time point when the connection problem is ended.

In still yet another aspect, the present disclosure provides in some embodiments a network device, including a memory, a transceiver and a processor. The memory is configured to store therein a computer program. The transceiver is configured to transmit and receive data under the control of the processor. The processor is configured to read the computer program in the memory, so as to: control the transceiver to receive through the transceiver parameter information about a connection problem from a UE, the parameter information being obtained in the case that the connection problem has been detected by the UE in a cell handover process and cell handover has been performed successfully, or in the case that the connection problem has been detected by the UE within a predetermined time period after the cell handover is performed successfully; and determine the MRO critical scenario in accordance with the parameter information, and obtaining a determination result of the MRO critical scenario.

Optionally, the parameter information includes at least one of: content information about the connection problem; location information about a location of the UE when the connection problem is detected by the UE; identification information about a source cell and identification information about a target cell; identification information about a cell to which the UE is instructed by a first handover command to hand over, the first handover command being transmitted by the target cell to the UE; or identification information about a cell where the connection problem occurs.

Optionally, the connection problem includes that an RLF occurs between the UE and the source cell after a second handover command has been received by the UE in a DAPS handover scenario, the parameter information includes second indication information, the second handover command is transmitted by the source cell and used to instruct the UE to hand over to the target cell, and the second indication information is used to indicate that the RLF occurs between the UE and the source cell.

Optionally, the connection problem includes at least one of: that a T310 timer is started and not expired; that a T312 timer is started and not expired; that the quantity of times of transmitting an MSGA in a random access process is greater than 1 and smaller than a first predetermined value, the MSGA being a message transmitted by the UE in a two-step random access process; that the quantity of times of transmitting an random access preamble sequence in the random access process is greater than 1 and smaller than a second predetermined value; that the random access process is successfully triggered by a beam failure recovery process; that an RLC protocol is retransmitted and the quantity of times of retransmitting the RLC protocol is smaller than a third predetermined value; or that an MAC layer has received a bottom-layer LBT failure indication, and the quantity of times of continuously receiving the LBT failure indication is smaller than a fourth predetermined value.

Optionally, the parameter information includes a duration of a connection problem timer, and the duration of the connection problem timer is a duration from a time point when last handover initialization is performed by the UE to a time point when the connection problem is detected, or a duration from the time point when the last handover initialization is performed by the UE to a time point when the connection problem is ended.

Optionally, the parameter information further includes at least one of: content information about the connection problem; location information about a location of the UE when the connection problem is detected by the UE by the UE; identification information about a source cell and identification information about a target cell; identification information about a cell to which the UE is instructed by a first handover command to hand over, the first handover command being transmitted by the target cell to the UE; or identification information about a cell where the connection problem occurs.

Optionally, in a conditional handover scenario or a DAPS handover scenario, a connection problem timer is set for each cell, and the cell is a source cell or a target cell in the cell handover process. In the case that the connection problem is a connection problem between the UE and the source cell, the duration of the connection problem timer in the parameter information is a duration of the connection problem timer set for the source cell. In the case that the connection problem is a connection problem between the UE and the target cell, the duration of the connection problem timer in the parameter information is a duration of the connection problem timer set for the target cell. The duration of the connection problem timer set for the source cell is a duration from a time point when last handover initialization is performed by the UE in the source cell to a time point when the connection problem is detected, or a duration from the time point when the last handover initialization is performed by the UE in the source cell to a time point when the connection problem is ended. The duration of the connection problem timer set for the target cell is a duration from a time point when last handover initialization is performed by the UE in the target cell to the time point when the connection problem is detected, or a duration from the time point when the last handover initialization is performed by the UE in the target cell to the time point when the connection problem is ended.

In still yet another aspect, the present disclosure provides in some embodiments a device for determining an MRO critical scenario for a UE, including: a parameter obtaining module configured to obtain parameter information about a connection problem in the case that the connection problem has been detected by the UE in a cell handover process and cell handover has been performed successfully, or in the case that the connection problem has been detected by the UE within a predetermined time period after the cell handover is performed successfully; and a transmission module configured to transmit the parameter information to a network device, so that the network device may determine the MRO critical scenario in accordance with the parameter information.

Optionally, the parameter information includes at least one of: content information about the connection problem; location information about a location of the UE when the connection problem is detected by the UE; identification information about a source cell and identification information about a target cell; identification information about a cell to which the UE is instructed by a first handover command to hand over, the first handover command being transmitted by the target cell to the UE; or identification information about a cell where the connection problem occurs.

Optionally, the connection problem includes that an RLF occurs between the UE and the source cell after a second handover command has been received by the UE in a DAPS handover scenario, the parameter information includes second indication information, the second handover command is transmitted by the source cell and used to instruct the UE to hand over to the target cell, and the second indication information is used to indicate that the RLF occurs between the UE and the source cell.

In still yet another aspect, the present disclosure provides in some embodiments a device for determining an MRO critical scenario for a network device, including: a parameter reception module configured to receive parameter information about a connection problem from a UE, the parameter information being obtained in the case that the connection problem has been detected by the UE in a cell handover process and cell handover has been performed successfully, or in the case that the connection problem has been detected by the UE within a predetermined time period after the cell handover is performed successfully; and a scenario determination module configured to determine the MRO critical scenario in accordance with the parameter information, and obtain a determination result of the MRO critical scenario.

Optionally, the parameter information includes at least one of: content information about the connection problem; location information about a location of the UE when the connection problem is detected by the UE; identification information about a source cell and identification information about a target cell; identification information about a cell to which the UE is instructed by a first handover command to hand over, the first handover command being transmitted by the target cell to the UE; or identification information about a cell where the connection problem occurs.

Optionally, the connection problem includes that an RLF occurs between the UE and the source cell after a second handover command has been received by the UE in a DAPS handover scenario, the parameter information includes second indication information, the second handover command is transmitted by the source cell and used to instruct the UE to hand over to the target cell, and the second indication information is used to indicate that the RLF occurs between the UE and the source cell.

In still yet another aspect, the present disclosure provides in some embodiments a system for determining an MRO critical scenario, including the above-mentioned UE and network device.

In still yet another aspect, the present disclosure provides in some embodiments a processor-readable storage medium storing therein a computer program. The computer program is executed by a processor so as to implement the above-mentioned method.

In still yet another aspect, the present disclosure provides in some embodiments a computer program including a computer-readable code. The computer-readable code is executed by a computing processing device so as to implement the above-mentioned method.

In still yet another aspect, the present disclosure provides in some embodiments a computer-readable medium storing therein the above-mentioned computer program.

According to the embodiments of the present disclosure, the UE obtains the parameter information about the connection problem in the case that the connection problem has been detected in the cell handover process and the cell handover has been performed successfully, or in the case that the connection problem has been detected within the predetermined time period after the cell handover is performed successfully, and then transmits the parameter information to the network device, so that the network device may determine the MRO critical scenario in accordance with the parameter information. In other words, in the embodiments of the present disclosure, in the case that the connection problem has been detected in a scenario where the cell handover is performed successfully, the parameter information about the connection problem is transmitted to the network device, so that the network device may determine the MRO critical scenario. As a result, in the embodiments of the present disclosure, it is able to determine the MRO critical scenario in the scenario where the cell handover is performed successfully.

The above description is merely an overview of the schemes in the embodiments of the present disclosure, and the schemes may be implemented in accordance with contents involved in the description so as to enable a person skilled in the art to understand the technical means of the present disclosure in a clearer manner. In order to make the objects, the technical solutions and the advantages of the present disclosure more apparent, the embodiments of the present disclosure will be described as follows.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

Figure 1:
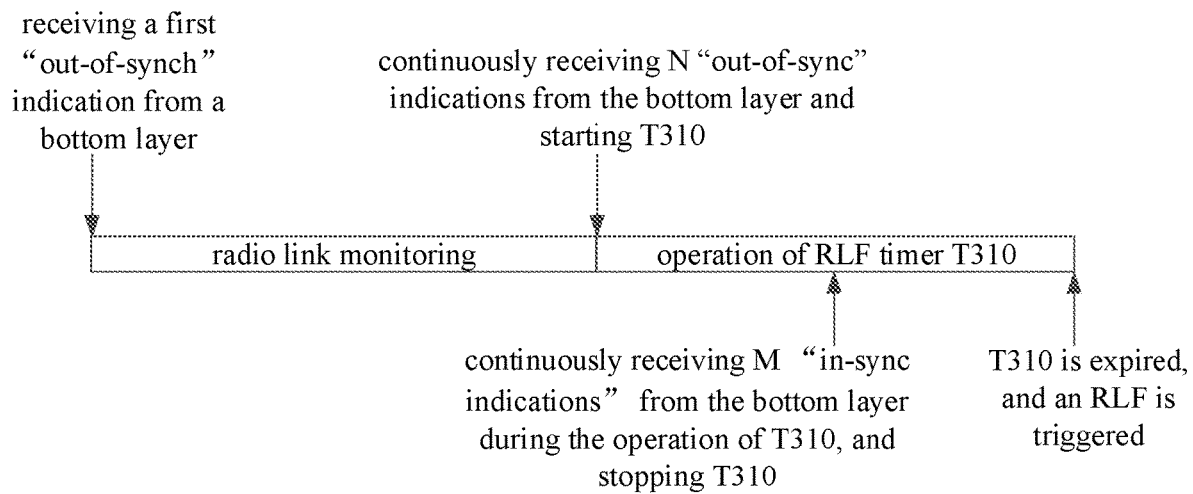
FIG. 1 is a schematic view showing an RLF due to the expiration of a T310 timer.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

The expression "and/or" in the embodiments of the present disclosure may be merely used to describe the relationship between objects, and it may include three relationships. For example, "A and/or B" may represent that, there is only A, there are both A and B, and there is only B. Further, the symbol "/" usually refers to "or".

The expression "a plurality of" refers to two or more, and the other quantifiers are similar.

The present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

An object of the present disclosure is to provide a method and a device for determining an MRO critical scenario, and an apparatus, so as to determine the MRO critical scenario in the case of successful cell handover.

The method and the device are provided on the basis of a same inventive concept, and a principle of the method for solving the problem is similar to that of the device, so the implementation of the device may refer to that of the method.

Schemes in the embodiments of the present disclosure may be applied to various systems (especially the 5G system), e.g., Global System of Mobile communication (GSM), Code Division Multiple Access (CDMA) system, Wideband Code Division Multiple Access (WCDMA) system, General Packet Radio Service (GPRS) system, Long Term Evolution (LTE) system, LTE Frequency Division Duplexing (FDD) system, LTE Time Division Duplexing (TDD) system, Long Term Evolution Advanced (LTE-A) system, Universal Mobile Telecommunication System (UMTS), Worldwide Interoperability for Microwave Access (WiMAX) system, or 5th-Generation (5G) New Radio (NR) system. Each of these systems includes a terminal device and a network device. Each system further includes a core network part, e.g., an Evolved Packet System (EPS) or 5G system (5GS).

The terminal involved in the embodiments of the present disclosure is a device for providing voice data and/or any other service data to a user, e.g., a handheld device having a wireless connection function, or any other processing device capable of being connected to a wireless modem. In different systems, the terminal device may have different names. For example, in a 5G system, the terminal device is called as User Equipment (UE). A wireless terminal device communicates with one or more Core Networks (CNs) via a Radio Access Network (RAN). The wireless terminal device may be a mobile terminal, e.g., a mobile phone (or cellular phone), or a computer having the mobile terminal device, e.g., a portable, pocket-sized, handheld, built-in or vehicle-mounted mobile device, which are capable of exchanging voice and/or data with the RAN. For example, the wireless terminal device may be a Personal Communication Service (PCS) telephone, a cordless telephone, a Session Initiation Protocol (SIP) phone, a Wireless Local Loop (WLL) station, or a Personal Digital Assistant (PDA). In addition, the wireless terminal device may also be called as system, subscriber unit, subscriber station, mobile station, mobile, remote station, remote terminal, access terminal, user terminal, user agent or user device, which will not be particularly defined herein.

The network device involved in the embodiments of the present disclosure may be a base station which includes a plurality of cells providing services for the terminal. Depending on different application scenarios, the base station is called as an access point, a device in an access network in communication with the wireless terminal device through one or more sectors on an air interface, or any other name. The network device is used to exchange a received air frame with an Internet Protocol (IP) packet, and it serves as a router between the wireless terminal device and the other part of the access network. The other part of the access network includes an IP communication network. The network device may further coordinate attribute management on the air interface. For example, the network device involved in the embodiments of the present disclosure is a Base Transceiver Station (BTS) in the GSM or CDMA system, a NodeB in the WCDMA system, an evolutional Node B (eNB, or e-NodeB) in the LTE system, a 5G base station (gNB) in 5G network architecture (next generation system), a Home evolved Node B (HeNB), a relay node, a femto, or a pico, which will not be particularly defined herein. In some network structures, the network device includes a Centralized Unit (CU) and a Distributed Unit (DU), which may be geographically separated from each other.

Multi Input Multi Output (MIMO transmission is performed between the network device and the terminal each with one or more antennae, and the MIMO transmission is Single User MIMO (SU-MIMO) or Multiple User MIMO (MU-MIMO). Depending on the form of an antenna combination and the quantity of antennae, the MIMO transmission may be 2D-MIMO, 3D-MIMO, FD-MIMO or massive-MIMO, and it may also be diversity transmission, precoding transmission or beam-forming transmission.

In order to facilitate the understanding of a method for determining an MRO critical scenario in the embodiments of the present disclosure, the too late handover, the too early handover and the handover to wrong cell will be described hereinafter at first.

Self-Organized Network (SON) includes Mobility Load Balancing optimization (MLB) and MRO, and the MRO includes the detection of too late handover, too early handover and handover to wrong cell.

In a first aspect, the too late handover usually refers to that a UE does not perform the handover in time in the case that a signal in a serving cell is insufficiently stable, and there mainly exist the following circumstances.

In a first circumstance, with respect to intra-system too late handover, an RLF occurs for the UE after the UE stays in a cell for a very long time period, and the UE tries to re-establish a radio link connection in the other cell.

In a second circumstance, with respect to inter-system too late handover, the RLF occurs for the UE after the UE stays in a cell belonging to a Next Generation Radio Access Network (NG-RAN) node for a very long time period, and the UE tries to reconnect to a cell belonging to an Evolved Universal Terrestrial Radio Access Network (E-UTRAN).

A too late handover detection mechanism will be described hereinafter.

If there is no recent handover process for the UE before a connection failure, e.g., there is no UE report timer or the UE report timer is greater than a configured threshold (e.g., Tstore_UE_cntxt), the intra-system too late handover occurs.

If the connection failure occurs when the UE is connected to the NG-RAN node, there is no latest handover process for the UE before the connection failure, i.e., there is no UE report timer or the UE report timer is greater than the configured threshold (e.g., Tstore_UE_cntxt), and a first node to which the UE tries to be re-connected, is an E-UTRAN node, the intra-system too late handover occurs.

In a second aspect, the too early handover usually refers to that a handover process is initiated by a base station in the case that a signal in a neighboring cell is insufficiently good or stable, and there mainly exist the following circumstances.

In a first circumstance, with respect to intra-system too early handover, after a handover command is issued by a source cell, the UE is successfully handed over to a target cell but the RLF occurs quickly or a handover failure occurs in the handover process, and a cell in which the UE tries to re-establish the connection is the source cell.

In a second circumstance, with respect to inter-system too early handover, the RLF occurs shortly after the UE is successfully handed over from a cell belonging to the E-UTRAN node to a target cell belonging to the NG-RAN node, and a cell to which the UE tries to be re-connected is a source cell or another cell belonging to the E-UTRAN node.

A too early handover detection mechanism will be described as follows.

If there is a recent handover process for the UE before a connection failure, e.g., a UE report timer is less than a configured threshold (e.g., Tstore_UE_cntxt), and a first cell in which the UE tries to re-establish the connection or a cell to which the UE tries to be re-connected is a cell serving the UE at latest handover initialization (i.e., a source cell), the intra-system too early handover occurs.

If the connection failure occurs when the UE is connected to the NG-RAN node, there is a latest inter-system handover process for the UE before the connection failure, e.g., a UE report timer is smaller than a configured threshold (e.g., Tstore_UE_cntxt), and a first cell to which the UE tries to be re-connected and the node serving the UE at the latest handover initialization are the E-UTRAN node, the inter-system too early handover occurs.

In a third aspect, for the handover to wrong cell, it is defined as that, with respect to the intra-system, the RLF occurs quickly or the handover failure occurs in the handover process after the UE is handed over from a source cell to a target cell, and then the UE selects a cell other than the source cell or the target cell to re-establish the connection.

A handover to wrong cell detection mechanism will be described as follows.

If there is a latest handover process for the UE before the connection failure, e.g., the UE report timer is smaller than the configured threshold (e.g., Tstore_UE_cntxt), and the first cell in which the UE tries to re-establish the connection or the cell to which the UE tries to be re-connected is neither the cell serving the UE at the last handover initialization, nor the cell which serves the UE and where the RLF occurs or the cell to which the UE is initially handed over, the handover to wrong cell occurs.

The UE report timer is a time from the last handover initialization to the connection failure.

In addition, in a New Radio (NR) system, the RLF is caused by one of the following reasons: (1) a T310 timer is expired; (2) a T312 timer is expired; (3) an MAC reports a random access problem (including beam failure recovery failure and a random access problem) under a certain condition; (4) an RLC reports that a Signaling Radio Bearer (SRB) or a Data Radio Bearer (DRB) reaches its maximum retransmission times under a certain condition; (5) an LBT failure occurs continuously under a certain condition; (6) a 5G IAB-Mobile Terminal (IAB-MT) receives a Backhaul RLF (BH RLF) indicator from its parent node.

In addition, as shown in FIG. 1, with respect to the expiration of T310, when a Radio Resource Control (RRC) of the UE continuously receives number N (e.g., a value of N310) of out-of-sync indications from a bottom layer, an RLF timer T310 is started.

When the RRC layer continuously receives number M (e.g., a value of N311) of in-sync indications during the operation of T310, it is considered as an out-of-sync problem has been solved, and the T310 timer is stopped. When it is impossible to continuously receive number M (e.g., a value of N311) of in-sync indications during the operation of T310, the T310 timer is expired, and it is considered that it is impossible to maintain a radio link, i.e., the RLF occurs. Subsequently, the UE may select a new cell to initiate a re-establishment process or enter an idle state depending on a specific condition.

The expiration of T312 is an enhancement of the RLF in a heterogeneous network. When T310 has been started, the UE generates a measurement report (a measurement report for the target cell). At this time, the timer T312 is started while the measurement report is transmitted by the UE. A total length of T312 is a maximum allowable time set by a network from a time when the measurement report is transmitted by the UE to a time when the handover command should be received. When T312 is expired, the RLF may directly occur for the UE before the expiration of T310. If T310 is stopped when a condition has been met, T312 is stopped too.

Figure 2:
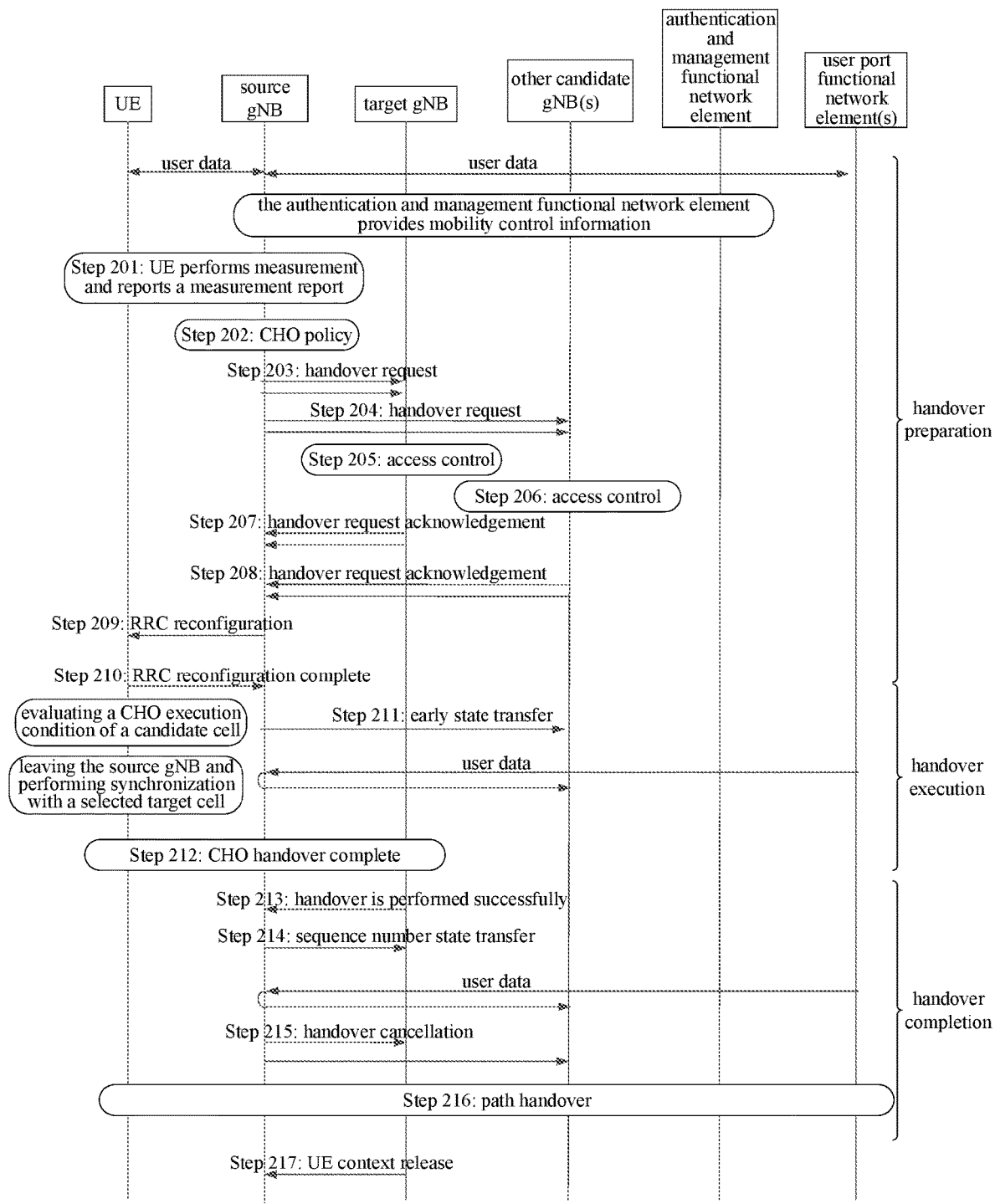
FIG. 2 is a flow chart of a CHO process.

In addition, as shown in FIG. 2, a Conditional Handover (CHO) process includes the following steps 201 to 217.

Step 201: the UE performs measurement and reports a measurement report.

Step 202: a source gNB decides to use CHO, i.e., performs a CHO policy.

Step 203: the source gNB transmits a handover request to a target gNB.

Step 204: the source gNB transmits a handover request to another candidate gNB.

Step 205: the target gNB performs access control.

Step 206: the other candidate gNB performs access control.

Step 207: the target gNB transmits a handover request acknowledgement to the source gNB.

Step 208: the other candidate gNB transmits a handover request acknowledgement to the source gNB.

Through steps 203 to 208, the source gNB requests for the CHO to one or more candidate gNBs, and the candidate gNB performs the access control and returns a CHO request.

Step 209: the source gNB transmits an RRC reconfiguration message to the UE, and the RRC reconfiguration message includes a configuration of a CHO candidate cell and a CHO execution condition.

Step 210: the UE transmits an RRC reconfiguration complete message to the source gNB.

Upon the receipt of the CHO configuration, the UE maintains a connection with the source gNB, and starts to evaluate the CHO execution condition for candidate cells. When at least one candidate cell meets the corresponding CHO execution condition, the UE leaves a current cell and performs synchronization with a newly-selected cell.

Step 211: when early data forwarding is applied, the source gNB transmits an early state transfer.

Step 212: the CHO handover is completed.

Step 213: the target gNB transmits a handover success message to the source gNB.

Step 214: the source gNB transmits a sequence number state transfer to the target gNB.

Step 215: handover cancellation is performed.

Step 216: path handover is performed.

Step 217: the target gNB transmits UE context release to the source gNB.

For a DAPS HO process, the UE maintains the connection with the source gNB upon the receipt of an RRC message for handover, and does not release the source cell until a random access to the target gNB has been performed successfully.

Figure 3:
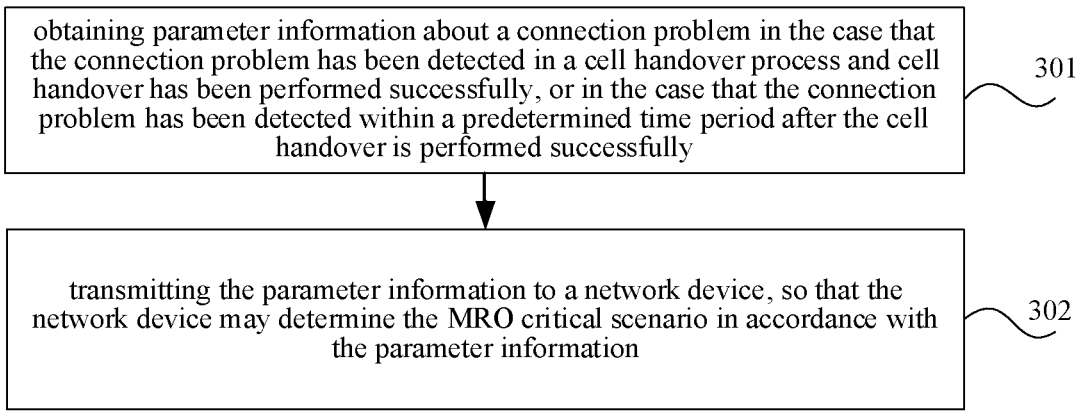
FIG. 3 is a flow chart of a method for determining an MRO critical scenario for a UE according to an embodiment of the present disclosure.

As shown in FIG. 3, the present disclosure provides in some embodiments a method for determining an MRO critical scenario for a UE, which includes the following steps.

Step 301: obtaining parameter information about a connection problem in the case that the connection problem has been detected by the UE in a cell handover process and cell handover has been performed successfully, or in the case that the connection problem has been detected by the UE within a predetermined time period after the cell handover is performed successfully.

A circumstance where the connection problem has been detected in a cell handover process and cell handover has been performed successfully or the connection problem has been detected within a predetermined time period after the cell handover is performed successfully belongs to a circumstance where the connection problem occurs is detected in scenario where the handover is performed successfully.

Optionally, the parameter information includes at least one of: content information about the connection problem; location information about a location of the UE when the connection problem is detected by the UE; identification information about a source cell and identification information about a target cell; identification information about a cell to which the UE is instructed by a first handover command to hand over, the first handover command being transmitted by the target cell to the UE; or identification information about a cell where the connection problem occurs.

Optionally, the connection problem includes that an RLF occurs between the UE and the source cell after a second handover command has been received by the UE in a DAPS handover scenario, the parameter information includes second indication information, the second handover command is transmitted by the source cell and used to instruct the UE to hand over to the target cell, and the second indication information is used to indicate that the RLF occurs between the UE and the source cell.

Optionally, the connection problem includes at least one of: that a T310 timer is started and not expired; that a T312 timer is started and not expired; that the quantity of times of transmitting an MSGA in a random access process is greater than 1 and smaller than a first predetermined value, the MSGA being a message transmitted by the UE in a two-step random access process; that the quantity of times of transmitting an random access preamble sequence in the random access process is greater than 1 and smaller than a second predetermined value; that the random access process is successfully triggered by a beam failure recovery process; that an RLC protocol is retransmitted and the quantity of times of retransmitting the RLC protocol is smaller than a third predetermined value; or that an MAC layer has received a bottom-layer LBT failure indication, and the quantity of times of continuously receiving the LBT failure indication is smaller than a fourth predetermined value.

The first predetermined value is preset maximum transmission times of the MSGA, the second predetermined value is preset maximum transmission times of a random access preamble, the third predetermined value is preset maximum retransmission times of the RLC, and the fourth predetermined value is maximum continuous reception times of the LBT.

Optionally, when the connection problem occurs at the UE and a cell serving the UE belongs to a 5G IAB node, the parameter information includes first indication information, and the first indication information is used to indicate that the connection problem occurs at the 5G IAB node or the connection problem is a Backhaul (BH) connection problem.

In other words, when the connection problem occurs at the UE and a cell serving the UE is a cell belonging to the IAB node, the parameter information carries the first indication information for indicating that the connection problem occurs at the IAB node or the connection problem is a backhaul connection problem. At this time, upon the receipt of the parameter information, the network device determines, in accordance with the first indication information, whether the cell serving the UE belongs to the IAB node or whether the connection problem is the backhaul connection problem when the connection problem occurs at the UE.

Step 302: transmitting the parameter information to a network device, so that the network device may determine the MRO critical scenario in accordance with the parameter information.

In the embodiments of the present disclosure, upon the receipt of the parameter information, the network device determines the MRO critical scenario in accordance with the parameter information.

The MRO critical scenario is at least one of an intra-system too late handover critical scenario, an intra-system too early handover critical scenario, an intra-system handover to wrong cell critical scenario, an inter-system too late handover critical scenario, or an inter-system too early handover critical scenario.

There probably exists the respective above-mentioned MRO critical scenario in each of a CHO scenario and a DAPS HO scenario.

According to the embodiments of the present disclosure, the UE obtains the parameter information about the connection problem in the case that the connection problem has been detected in the cell handover process and the cell handover has been performed successfully, or in the case that the connection problem has been detected within the predetermined time period after the cell handover is performed successfully, and then transmits the parameter information to the network device, so that the network device may determine the MRO critical scenario in accordance with the parameter information. In other words, in the embodiments of the present disclosure, in the case that the connection problem has been detected in a scenario where the cell handover is performed successfully, the parameter information about the connection problem is transmitted to the network device, so that the network device may determine the MRO critical scenario. As a result, it is able to determine the MRO critical scenario in the scenario where the cell handover is performed successfully.

Optionally, the parameter information includes a duration of a connection problem timer, and the duration of the connection problem timer is a duration from a time point when last handover initialization is performed by the UE to a time point when the connection problem is detected, or a duration from the time point when the last handover initialization is performed by the UE to a time point when the connection problem is ended.

The time point when the handover initialization is performed is just a time point when a cell handover command is received by the UE. Hence, upon the receipt of the cell handover command, the UE records the time point, and starts the connection problem timer. The connection problem timer is not stopped until the connection problem is detected or the connection problem is ended.

Optionally, in a conditional handover scenario or a DAPS handover scenario, a connection problem timer is set for each cell, and the cell is a source cell or a target cell in the cell handover process. In the case that the connection problem is a connection problem between the UE and the source cell, the duration of the connection problem timer in the parameter information is a duration of the connection problem timer set for the source cell. In the case that the connection problem is a connection problem between the UE and the target cell, the duration of the connection problem timer in the parameter information is a duration of the connection problem timer set for the target cell. The duration of the connection problem timer set for the source cell is a duration from a time point when last handover initialization is performed by the UE in the source cell to a time point when the connection problem is detected, or a duration from the time point when the last handover initialization is performed by the UE in the source cell to a time point when the connection problem is ended. The duration of the connection problem timer set for the target cell is a duration from a time point when last handover initialization is performed by the UE in the target cell to the time point when the connection problem is detected, or a duration from the time point when the last handover initialization is performed by the UE in the target cell to the time point when the connection problem is ended.

In a cell handover process in a normal scenario (i.e., a scenario other than the CHO scenario and the DAPS HO scenario), upon the receipt of the handover command for instructing the UE to hand over to the target cell from the source cell, the UE disconnects with the source cell. Hence, in the cell handover process in the normal scenario, after the UE has received the handover command for instructing the UE to hand over to the target cell from the source cell, it does not detect the connection problem between the UE and the source cell any longer. In the cell handover process in the normal scenario, each UE merely needs to be provided with a respective one connection problem timer.

In the CHO scenario and the DAPS HO scenario, upon the receipt of the handover command for instructing the UE to hand over to the target cell from the source cell, the UE maintains the connection with the source cell for a certain time period. Hence, in the CHO scenario and the DAPS HO scenario, after the UE has received the handover command for instructing the UE to hand over to the target cell from the source cell, the connection problem may still occur between the UE and the source cell.

Hence, in the CHO scenario and the DAPS HO scenario, a respective one connection problem timer needs to be provided for each cell, i.e., a respective one connection problem timer needs to be provided for each of the source cell and the target cell in the cell handover process. The duration of the connection problem timer set for the source cell is defined as a duration from the time point when last handover initialization is performed by the UE in the source cell (i.e., a time point when the handover command for instructing the UE to hand over to the source cell is most recently received by the UE) to the time point when the connection problem is detected, or a duration from the time point when the last handover initialization is performed by the UE in the source cell to the time point when the connection problem is ended. The duration of the connection problem timer set for the target cell is defined as a duration from the time point when last handover initialization is performed by the UE in the target cell (i.e., a time point when the handover command for instructing the UE to hand over to the target cell is most recently received by the UE) to the time point when the connection problem is detected, or a duration from the time point when the last handover initialization is performed by the UE in the target cell to the time point when the connection problem is ended.

In this regard, in a scenario where the handover is performed successfully, when the connection problem between the UE and the source cell is detected, the duration of the connection problem timer set for the source cell needs to be transmitted to the network device as the parameter information about the connection problem. When the connection problem between the UE and the target cell is detected, the duration of the connection problem timer set for the target cell needs to be transmitted to the network device as the parameter information about the connection problem.

Optionally, the parameter information further includes at least one of: content information about the connection problem; location information about a location of the UE when the connection problem is detected by the UE by the UE; identification information about a source cell and identification information about a target cell; identification information about a cell to which the UE is instructed by a first handover command to hand over, the first handover command being transmitted by the target cell to the UE; or identification information about a cell where the connection problem occurs.

The content information about the connection problem just refers to a type of the detected connection problem.

In addition, the identification information about the cell includes a Public Land Mobile Network Identity (PLMN ID), a cell ID and a Tracking Area (TA) code, or includes a physical cell ID (phyCellID) and a carrier frequency (carrierFreq). The PLMN ID, the cell ID and the TA code are used together to uniquely identify a cell, and the phyCellID and the carrierFreq are used together to uniquely identify a cell.

It should be appreciated that, in the scenario where the handover is performed successfully, when the connection problem is detected at different time points, the specific contents of the parameter information about the connection problem timer may be different.

In a first circumstance, in the case that the connection problem is detected in the cell handover process and the second handover command is received from the source cell within a time period where the connection problem occurs or after the connection problem is ended, the parameter information includes the duration of the connection problem timer, the identification information about the source cell, and the identification information about the target cell.

Upon the receipt of the parameter information, the network device determines that the MRO critical scenario is the intra-system too late handover critical scenario in the case that the network device determines that the source cell and the target cell belong to a same system in accordance with the identification information about the source cell and the identification information about the target cell and there is no connection problem timer; or determines that the MRO critical scenario is the intra-system too late handover critical scenario in the case that the network device determines that the source cell and the target cell belong to a same system in accordance with the identification information about the source cell and the identification information about the target cell and the duration of the connection problem timer is greater than the first predetermined threshold; or determines that the MRO critical scenario is the inter-system too late handover critical scenario in the case that the network device determines that the source cell and the target cell belong to different systems in accordance with the identification information about the source cell and the identification information about the target cell and (e.g., the source cell belongs to the NG-RAN node and the target cell belongs to the E-UTRAN node) and there is no connection problem timer; or determines that the MRO critical scenario is the inter-system too late handover critical scenario in the case that the network device determines that the source cell and the target cell belong to different systems in accordance with the identification information about the source cell and the identification information about the target cell and (e.g., the source cell belongs to the NG-RAN node and the target cell belongs to the E-UTRAN node) and the duration of the connection problem timer is greater than the first predetermined threshold.

It should be appreciated that, when there is no connection problem timer, it means that no cell handover is performed within a time period before the connection problem occurs.

In a second circumstance, in the case that the connection problem is detected after the cell handover is completed and the first handover command fails to be received from the target cell within a time period where the connection problem occurs or after the connection problem is ended, the parameter information includes the duration of the connection problem timer, the identification information about the source cell, and the identification information about the target cell.

Upon the receipt of the parameter information, the network device determines that the MRO critical scenario is the intra-system too early handover critical scenario in the case that the network device determines that the source cell and the target cell belong to a same system in accordance with the identification information about the source cell and the identification information about the target cell and the duration of the connection problem timer is smaller than or equal to the first predetermined threshold.

In a third circumstance, in the case that the connection problem is detected after the cell handover is completed and the first handover command is received from the target cell within a time period where the connection problem occurs or after the connection problem is ended, the parameter information about the connection problem includes the duration of the connection problem timer, the identification information about the source cell, the identification information about the target cell, and identification information about a cell to which the UE is instructed by a first handover command to hand over.

Upon the receipt of the parameter information, the network device determines that the MRO critical scenario is the intra-system too early handover critical scenario, in the case that the network device determines that the source cell and the target cell belong to a same system in accordance with the identification information about the source cell and the identification information about the target cell, identification information about a cell to which the UE is instructed by a first handover command to hand over is the same as the identification information about the source cell, and the duration of the connection problem timer is smaller than or equal to the first predetermined threshold; or the network device determines that the MRO critical scenario is the intra-system handover to wrong cell critical scenario, in the case that the network device determines that the source cell and the target cell belong to a same system in accordance with the identification information about the source cell and the identification information about the target cell, identification information about a cell to which the UE is instructed by a first handover command to hand over is different from the identification information about the source cell, and the duration of the connection problem timer is smaller than or equal to the first predetermined threshold.

In a fourth circumstance, in the case that the connection problem is detected after the cell handover is completed, the parameter information about the connection problem includes the duration of the connection problem timer, the identification information about the source cell and the identification information about the target cell.

Upon the receipt of the parameter information, the network device determines that the MRO critical scenario is the inter-system too early handover critical scenario in the case that the network device determines that the source cell and the target cell belong to different systems in accordance with the identification information about the source cell and the identification information about the target cell (e.g., the source cell is the E-UTRAN node and the target cell is the NG-RAN node) and the duration of the connection problem timer is smaller than or equal to the first predetermined threshold.

In a fifth circumstance, in the case that the cell handover is cell handover in a target scenario and the connection problem is detected in the cell handover process, the parameter information includes the duration of the connection problem timer set for the source cell, the identification information about the source cell and the identification information about the target cell.

Upon the receipt of the parameter information, the network device determines that the MRO critical scenario is the intra-system too late handover critical scenario in the target scenario in the case that the network device determines that the source cell and the target cell belong to a same system in accordance with the identification information about the source cell and the identification information about the target cell and there is no connection problem timer set for the source cell; or the network device determines that the MRO critical scenario is the intra-system too late handover critical scenario in the target scenario in the case that the network device determines that the source cell and the target cell belong to a same system in accordance with the identification information about the source cell and the identification information about the target cell and the duration of the connection problem timer set for the source cell is greater than the first predetermined value. The target scenario is the CHO scenario or the DAPS HO scenario.

Here, it should be appreciated that, when there is no handover from the other cell to the source cell before the connection problem occurs, there is no connection problem timer set for the source cell.

Optionally, the connection problem further includes that an RLF occurs between the UE and the source cell after a second handover command has been received by the UE in a DAPS handover scenario, the parameter information further includes second indication information, the second handover command is a handover command transmitted by the source cell for indicating the UE to hand over to the target cell, and the second indication information is used to indicate that the RLF occurs between the UE and the source cell.

In other words, in the DAPS HO scenario, in the case that the RLF between the UE and the source cell is detected by the UE after the receipt of the second handover command for instructing the UE to hand over to the target cell from the source cell, the second indication information indicating the RLF between the UE and the source cell is carried in the parameter information and transmitted to the network device.

Figure 4:
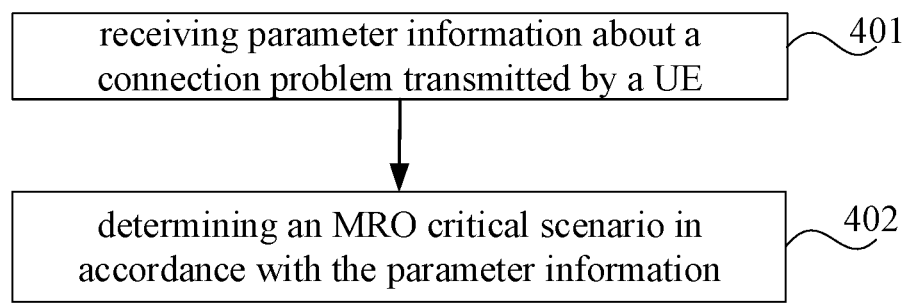
FIG. 4 is a flow chart of a method for determining an MRO critical scenario for a network device according to an embodiment of the present disclosure.

As shown in FIG. 4, the present disclosure further provides in some embodiments a method for determining an MRO critical scenario for a network device, which includes the following steps.

Step 401: receiving parameter information about a connection problem transmitted by a UE.

The parameter information is obtained by the UE in the case that the connection problem has been detected by the UE in a cell handover process and cell handover has been performed successfully, or in the case that the connection problem has been detected by the UE within a predetermined time period after the cell handover is performed successfully.

In addition, a circumstance where the connection problem has been detected in a cell handover process and cell handover has been performed successfully or the connection problem has been detected within a predetermined time period after the cell handover is performed successfully belongs to a circumstance where the connection problem occurs is detected in scenario where the handover is performed successfully.

Optionally, the parameter information includes at least one of: content information about the connection problem; location information about a location of the UE when the connection problem is detected by the UE; identification information about a source cell and identification information about a target cell; identification information about a cell to which the UE is instructed by a first handover command to hand over, the first handover command being transmitted by the target cell to the UE; or identification information about a cell where the connection problem occurs.

Optionally, the connection problem includes that an RLF occurs between the UE and the source cell after a second handover command has been received by the UE in a DAPS handover scenario, the parameter information includes second indication information, the second handover command is transmitted by the source cell and used to instruct the UE to hand over to the target cell, and the second indication information is used to indicate that the RLF occurs between the UE and the source cell.

Optionally, the connection problem includes at least one of: that a T310 timer is started and not expired; that a T312 timer is started and not expired; that the quantity of times of transmitting an MSGA in a random access process is greater than 1 and smaller than a first predetermined value, the MSGA being a message transmitted by the UE in a two-step random access process; that the quantity of times of transmitting an random access preamble sequence in the random access process is greater than 1 and smaller than a second predetermined value; that the random access process is successfully triggered by a beam failure recovery process; that an RLC protocol is retransmitted and the quantity of times of retransmitting the RLC protocol is smaller than a third predetermined value; or that an MAC layer has received a bottom-layer LBT failure indication, and the quantity of times of continuously receiving the LBT failure indication is smaller than a fourth predetermined value.

The first predetermined value is preset maximum transmission times of the MSGA, the second predetermined value is preset maximum transmission times of a random access preamble, the third predetermined value is preset maximum retransmission times of the RLC, and the fourth predetermined value is maximum continuous reception times of the LBT.

Optionally, when the connection problem occurs at the UE and a cell serving the UE belongs to a 5G IAB node, the parameter information includes first indication information, and the first indication information is used to indicate that the connection problem occurs at the 5G IAB node or the connection problem is a backhaul connection problem.

In other words, when the connection problem occurs at the UE and a cell serving the UE is a cell belonging to the IAB node, the parameter information carries the first indication information for indicating that the connection problem occurs at the IAB node or the connection problem is a backhaul connection problem. At this time, upon the receipt of the parameter information, the network device determines, in accordance with the first indication information, whether the cell serving the UE belongs to the IAB node or whether the connection problem is the backhaul connection problem when the connection problem occurs at the UE.

Step 402: determining the MRO critical scenario in accordance with the parameter information, and obtaining a determination result of the MRO critical scenario.

The MRO critical scenario is at least one of an intra-system too late handover critical scenario, an intra-system too early handover critical scenario, an intra-system handover to wrong cell critical scenario, an inter-system too late handover critical scenario, or an inter-system too early handover critical scenario.

There probably exists the above-mentioned MRO critical scenario in each of a CHO scenario and a DAPS HO scenario.

According to the embodiments of the present disclosure, the UE obtains the parameter information about the connection problem in the case that the connection problem has been detected in the cell handover process and the cell handover has been performed successfully, or in the case that the connection problem has been detected within the predetermined time period after the cell handover is performed successfully, and then transmits the parameter information to the network device, so that the network device may determine the MRO critical scenario in accordance with the parameter information. In other words, in the embodiments of the present disclosure, in the case that the connection problem has been detected in a scenario where the cell handover is performed successfully, the parameter information about the connection problem is transmitted to the network device, so that the network device may determine the MRO critical scenario. As a result, it is able to determine the MRO critical scenario in the scenario where the cell handover is performed successfully.

Optionally, the parameter information includes a duration of a connection problem timer, and the duration of the connection problem timer is a duration from a time point when last handover initialization is performed by the UE to a time point when the connection problem is detected, or a duration from the time point when the last handover initialization is performed by the UE to a time point when the connection problem is ended.

The time point when the handover initialization is performed is just a time point when a cell handover command is received by the UE. Hence, upon the receipt of the cell handover command, the UE records the time point, and starts the connection problem timer. The connection problem timer is not stopped until the connection problem is detected or the connection problem is ended.

Optionally, in a conditional handover scenario or a DAPS handover scenario, a connection problem timer is set for each cell, and the cell is a source cell or a target cell in the cell handover process. In the case that the connection problem is a connection problem between the UE and the source cell, the duration of the connection problem timer in the parameter information is a duration of the connection problem timer set for the source cell. In the case that the connection problem is a connection problem between the UE and the target cell, the duration of the connection problem timer in the parameter information is a duration of the connection problem timer set for the target cell. The duration of the connection problem timer set for the source cell is a duration from a time point when last handover initialization is performed by the UE in the source cell to a time point when the connection problem is detected, or a duration from the time point when the last handover initialization is performed by the UE in the source cell to a time point when the connection problem is ended. The duration of the connection problem timer set for the target cell is a duration from a time point when last handover initialization is performed by the UE in the target cell to the time point when the connection problem is detected, or a duration from the time point when the last handover initialization is performed by the UE in the target cell to the time point when the connection problem is ended.

In a cell handover process in a normal scenario (i.e., a scenario other than the CHO scenario and the DAPS HO scenario), upon the receipt of the handover command for instructing the UE to hand over to the target cell from the source cell, the UE disconnects with the source cell. Hence, in the cell handover process in the normal scenario, after the UE has received the handover command for instructing the UE to hand over to the target cell from the source cell, it does not detect the connection problem between the UE and the source cell any longer. In the cell handover process in the normal scenario, each UE merely needs to be provided with a respective one connection problem timer.

In the CHO scenario and the DAPS HO scenario, upon the receipt of the handover command for instructing the UE to hand over to the target cell from the source cell, the UE maintains the connection with the source cell for a certain time period. Hence, in the CHO scenario and the DAPS HO scenario, after the UE has received the handover command for instructing the UE to hand over to the target cell from the source cell, the connection problem may still occur between the UE and the source cell.

Hence, in the CHO scenario and the DAPS HO scenario, a respective one connection problem timer needs to be provided for each cell, i.e., a respective one connection problem timer needs to be provided for each of the source cell and the target cell in the cell handover process. The duration of the connection problem timer set for the source cell is defined as a duration from the time point when last handover initialization is performed by the UE in the source cell (i.e., a time point when the handover command for instructing the UE to hand over to the source cell is most recently received by the UE) to the time point when the connection problem is detected, or a duration from the time point when the last handover initialization is performed by the UE in the source cell to the time point when the connection problem is ended. The duration of the connection problem timer set for the target cell is defined as a duration from the time point when last handover initialization is performed by the UE in the target cell (i.e., a time point when the handover command for instructing the UE to hand over to the target cell is most recently received by the UE) to the time point when the connection problem is detected, or a duration from the time point when the last handover initialization is performed by the UE in the target cell to the time point when the connection problem is ended.

In this regard, in a scenario where the handover is performed successfully, when the connection problem between the UE and the source cell is detected, the duration of the connection problem timer set for the source cell needs to be transmitted to the network device as the parameter information about the connection problem. When the connection problem between the UE and the target cell is detected, the duration of the connection problem timer set for the target cell needs to be transmitted to the network device as the parameter information about the connection problem.

Optionally, the parameter information further includes at least one of: content information about the connection problem; location information about a location of the UE when the connection problem is detected by the UE by the UE; identification information about a source cell and identification information about a target cell; identification information about a cell to which the UE is instructed by a first handover command to hand over, the first handover command being transmitted by the target cell to the UE; or identification information about a cell where the connection problem occurs.

The content information about the connection problem just refers to a type of the detected connection problem.

In addition, the identification information about the cell includes a PLMN ID, a cell ID and a TA code, or includes a physical cell ID (phyCellID) and a carrier frequency (carrierFreq). The PLMN ID, the cell ID and the TA code are used together to uniquely identify a cell, and the phyCellID and the carrierFreq are used together to uniquely identify a cell.

It should be appreciated that, in the scenario where the handover is performed successfully, when the connection problem is detected at different time points, the specific contents of the parameter information about the connection problem timer may be different.

Optionally, the connection problem further includes that an RLF occurs between the UE and the source cell after a second handover command has been received by the UE in a DAPS handover scenario, the parameter information further includes second indication information, the second handover command is a handover command transmitted by the source cell for indicating the UE to hand over to the target cell, and the second indication information is used to indicate that the RLF occurs between the UE and the source cell.

In other words, in the DAPS HO scenario, in the case that the RLF between the UE and the source cell is detected by the UE upon the receipt of the second handover command for instructing the UE to hand over to the target cell from the source cell, the second indication information indicating the RLF between the UE and the source cell is carried in the parameter information and transmitted to the network device.

Optionally, the network device is a cell where the connection problem occurs; or when the network device is not the cell where the connection problem occurs, the method further includes transmitting the parameter information to the cell where the connection problem occurs.

It should be appreciated that, in the scenario where the handover is performed successfully, when the connection problem is detected at different time points and the cells where the connection problem occurs are different, the network device receiving the parameter information from the UE may be different too, which is as follows.

In a first circumstance, in the case that the connection problem is detected in the cell handover process and the second handover command is received from the source cell within a time period where the connection problem occurs or after the connection problem is ended, the UE transmits the parameter information to the target cell, and then the target cell transmits the parameter information to the source cell. In other words, when the network device receiving the parameter information from the UE is the target cell and the target cell is not a cell where the connection problem occurs, the target cell needs to transmit the parameter information to the source cell where the connection problem occurs.

In a second circumstance, in the case that the connection problem is detected after the cell handover is completed and the first handover command fails to be received from the target cell within a time period where the connection problem occurs or after the connection problem is ended, the UE directly transmits the parameter information to the target cell where the connection problem occurs. In this case, the network device receiving the parameter information from the UE is the target cell. Although the connection problem occurs in the target cell, it occurs shortly after the handover is completed, so the connection problem is caused due to inappropriate configuration of the handover parameter, i.e., inappropriate configuration of the handover parameter in the source cell. Hence, the target cell further needs to transmit the parameter information and the determination result of the MRO critical scenario to the source cell.

In a third circumstance, in the case that the connection problem is detected after the cell handover is completed and the first handover command is received from the target cell within a time period where the connection problem occurs or after the connection problem is ended, the UE transmits the parameter information to the cell to which the UE is instructed by the first handover command to hand over, and then the cell forwards the parameter information to the target cell where the connection problem occurs. In this case, the network device receiving the parameter information from the UE is the cell to which the UE is instructed by the first handover command to hand over, and the cell to which the UE is instructed by the first handover command to hand over is not a cell where the connection problem occurs, so the cell to which the UE is instructed by the first handover command to hand over needs to transmit the parameter information to the target cell where the connection problem occurs. Identically, although the connection problem occurs in the target cell, it occurs shortly after the handover is completed, so the connection problem is caused due to inappropriate configuration of the handover parameter, i.e., inappropriate configuration of the handover parameter in the source cell. Hence, the target cell further needs to transmit the parameter information and the determination result of the MRO critical scenario to the source cell.

Optionally, in the case that the MRO critical scenario is one of the inter-system too early handover critical scenario or the intra-system too early handover critical scenario, the method further includes transmitting the determination result of the MRO critical scenario and the parameter information to a cell where a parameter needs to be adjusted.

In the intra-system too early handover critical scenario and the inter-system too early handover critical scenario, the cell where the connection problem occurs is the target cell, but a basic cause for the connection problem lies in the inappropriate configuration of the handover parameter in the source cell. Hence, in the intra-system too early handover critical scenario and the inter-system too early handover critical scenario, the cell where the parameter needs to be adjusted is the source cell.

To be specific, in the case that the connection problem is detected after the cell handover is completed and the first handover command fails to be received from the target cell within a time period where the connection problem occurs or after the connection problem is ended, the network device receiving the parameter information from the UE is the target cell. When the target cell determines that the source cell and the target cell belong to a same system in accordance with the parameter information and the duration of the connection problem timer is smaller than or equal to the first predetermined threshold, the MRO critical scenario is determined as the intra-system too early handover critical scenario. In addition, the target cell further transmits the determination result indicating that the MRO critical scenario is the intra-system too early handover critical scenario as well as the parameter information to the source cell where the parameter needs to be adjusted.

Alternatively, in the case that the connection problem is detected after the cell handover is completed and the first handover command is received from the target cell within a time period where the connection problem occurs or after the connection problem is ended, the network device receiving the parameter information from the UE is a cell to which the UE is instructed by the first handover command to hand over. Upon the receipt of the parameter information, the cell to which the UE is instructed by the first handover command to hand over forwards it to the target cell. When the target cell determines that the source cell and the target cell belong to a same system in accordance with the parameter information, the cell to which the UE is instructed by the first handover command to hand over is the source cell and the duration of the connection problem timer is smaller than or equal to the first predetermined threshold, the MRO critical scenario is determined as the intra-system too early handover critical scenario. In addition, the target cell further transmits the determination result indicating that the MRO critical scenario is the intra-system too early handover critical scenario as well as the parameter information to the source cell where the parameter needs to be adjusted.

Alternatively, in the case that the connection problem is detected after the cell handover is completed, the network device receiving the parameter information from the UE is the target cell. When the target cell determines that the source cell and the target cell belong to different systems in accordance with the parameter information, and the duration of the connection problem timer is smaller than or equal to the first predetermined threshold, it determines that the MRO critical scenario is the inter-system too early handover critical scenario. In addition, the target cell further transmits the determination result indicating that the MRO critical scenario is the inter-system too early handover critical scenario as well as the parameter information to the source cell where the parameter needs to be adjusted.

Optionally, in the case that the MRO critical scenario is the intra-system handover to wrong cell critical scenario, the method further includes transmitting the determination result of the MRO critical scenario, the parameter information and identification information about a cell to which the UE is instructed by a first handover command to hand over to a cell where a parameter needs to be adjusted. The first handover command is a handover command transmitted by the target cell to the UE.

In addition, in the intra-system handover to wrong cell critical scenario, the cell where the connection problem occurs is the target cell, but a basic cause for the connection problem lies in that the handover parameter of the source cell is inappropriate. Hence, in the intra-system handover to wrong cell critical scenario, the cell where the parameter needs to be adjusted is the source cell.

To be specific, in the case that the connection problem is detected after the cell handover is completed and the first handover command is received from the target cell within a time period where the connection problem occurs or after the connection problem is ended, the network device receiving the parameter information from the UE is a cell to which the UE is instructed by the first handover command to hand over. Upon the receipt of the parameter information, the cell to which the UE is instructed by the first handover command to hand over forwards it to the target cell. When the target cell determines that the source cell and the target cell belong to a same system in accordance with the parameter information, the cell to which the UE is instructed by the first handover command to hand over is not the source cell and the duration of the connection problem timer is smaller than or equal to the first predetermined threshold, it determines that the MRO critical scenario is the intra-system handover to wrong cell critical scenario. In addition, the target cell further transmits the determination result indicating that the MRO critical scenario is the intra-system handover to wrong cell critical scenario, the parameter information as well as the identification about the cell to which the UE is instructed by the first handover command to hand over to the source cell where the parameter needs to be adjusted.

The above-mentioned description relates to the methods for determining the MRO critical scenario at a UE side and a network side device. The implementation of the method will be further described hereinafter when the connection problem is that T310 is started but not expired.

First Embodiment

When the connection problem is that T310 is started but not expired, the connection problem timer set for the UE is a time from the last handover initialization to a time point when T310 is stopped.

There are the following two scenarios depending on a start time of T310 and the duration of the connection problem timer set for the UE.

Figure 5:
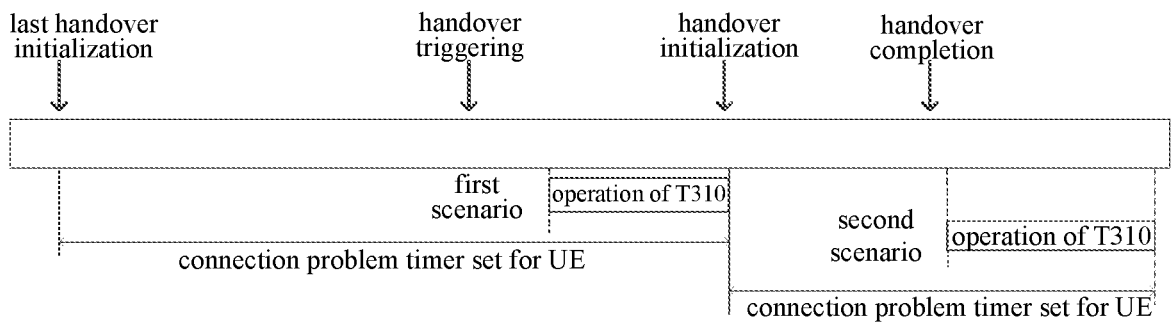
FIG. 5 is a schematic view showing an MRO critical scenario according to an embodiment of the present disclosure.

In a first scenario as shown in FIG. 5, when the UE starts T310 in the source cell in the handover process, and receives the second handover command instructing the UE to hand over to the target cell from the source cell during the operation of T310 (i.e., the UE detects the handover initialization during the operation of T310), T310 is stopped. At this time, the UE collects the start time of T310, the connection problem timer set for the UE, an ID of the UE in the source cell, relevant measurement information, the identification information about the source cell, the identification information about the target cell and the identification information about the cell where the connection problem occurs. The UE reports the collected information to the target cell, and the target cell determines the MRO critical scenario in accordance with the collected information. When the source cell and the target cell belong to a same system and there is no connection problem timer set for the UE or the duration of the connection problem timer is greater than a preconfigured target threshold, the MRO critical scenario is determined as the intra-system too late handover critical scenario.

In a second scenario as shown in FIG. 5, when the UE starts T310 in the target cell shortly after the handover is completed and the UE has continuously received in-sync indications from a bottom layer, T310 is stopped. At this time, the UE collects a start time of T310, the connection problem timer set for the UE, an ID of the UE in the source cell, relevant measurement information, the identification information about the source cell, the identification information about the target cell and the identification information about the cell where the connection problem occurs. The UE reports the collected information to the target cell, and the target cell determines the MRO critical scenario in accordance with the collected information. When the source cell and the target cell belong to a same system and the duration of the connection problem timer set for the UE is smaller than or equal to the preconfigured target threshold, the MRO critical scenario is determined as the intra-system too early handover critical scenario.

The first scenario and the second scenario may exist concurrently in a same handover process.

In addition, upon the receipt of the information collected by the UE, the target cell determines whether the identification information that is included in the information collected by the UE and about the cell where the connection problem occurs is the same as the identification information about a current cell. When the identification information that is included in the information collected by the UE and about the cell where the connection problem occurs is the same as the identification information about the current cell and the target cell determines that the MRO critical scenario is the intra-system too early handover critical scenario, the target cell transmits the determination result indicating that the MRO critical scenario is the intra-system too early handover critical scenario as well as the information collected by the UE to the source cell. When the identification information that is included in the information collected by the UE and about the cell where the connection problem occurs is different from the identification information about the current cell, the target cell transmits the information collected by the UE to the source cell.

Here, it should be appreciated that, in the intra-system too early handover critical scenario, although the cell where the connection problem occurs is the target cell, a basic cause for the connection problem lies in that the parameter of the source cell is inappropriate. Hence, in this scenario, the target cell transmits the determination result indicating that the MRO critical scenario is the intra-system too early handover critical scenario as well as the information collected by the UE to the source cell (i.e., the cell where the parameter needs to be adjusted), so that the source cell adjusts the parameter to solve the connection problem.

In the intra-system too late handover critical scenario, the cell where the connection problem occurs is the source cell, i.e., a basic cause for the connection problem also lies in the source cell and the source cell is just the cell where the connection problem occurs and the cell where the parameter needs to be adjusted. Hence, in this scenario, the target cell transmits the collected information to the source cell, so that the source cell adjusts the parameter to solve the connection problem.

Second Embodiment

When the connection problem is that T310 is started but not expired, the connection problem timer set for the UE is a time from the last handover initialization to a time point when T310 is stopped.

Figure 6:
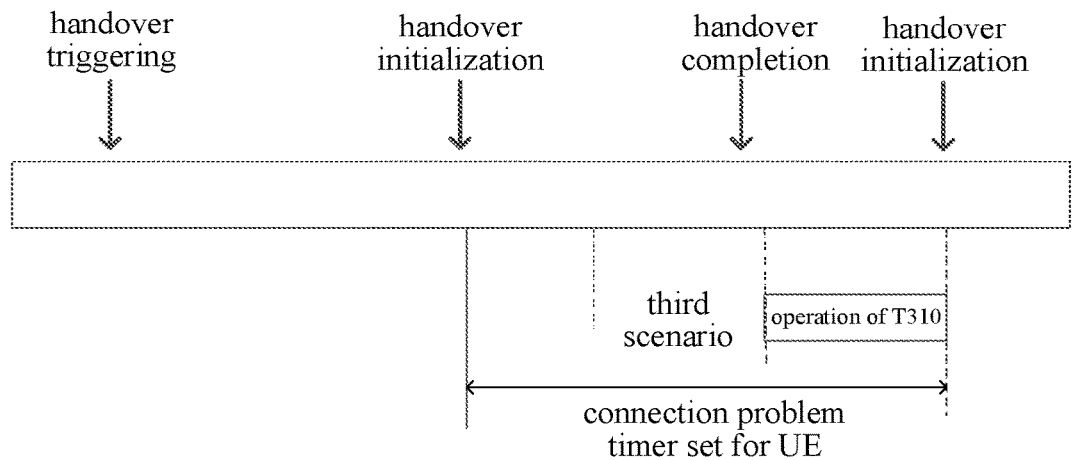
FIG. 6 is another schematic view showing the MRO critical scenario according to an embodiment of the present disclosure.
Figure 7:
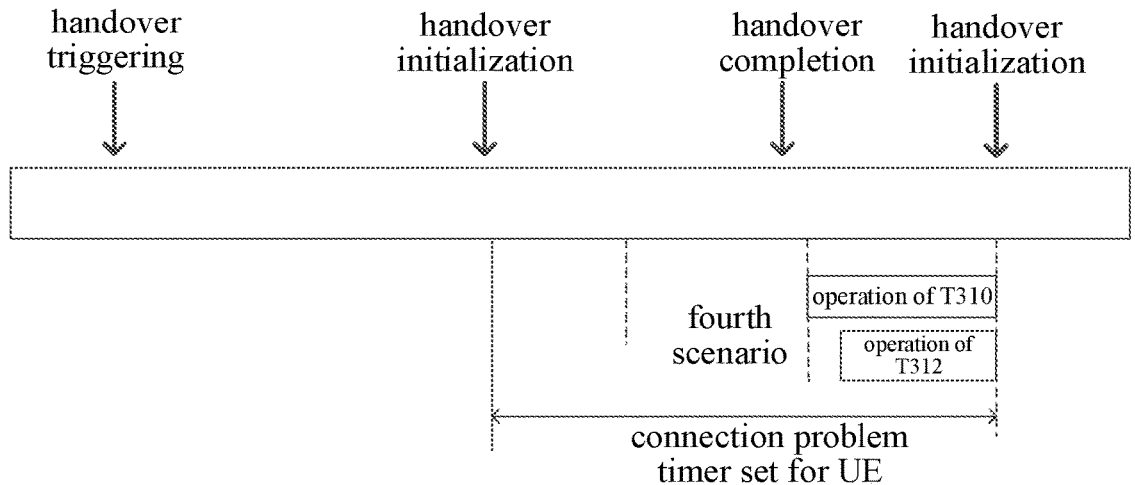
FIG. 7 is yet another schematic view showing the MRO critical scenario according to an embodiment of the present disclosure.

In a third scenario as shown in FIG. 6 and a fourth scenario as shown in FIG. 7, when the UE starts T310 in the target cell shortly after the handover is completed and the UE has received the first handover command from the target cell during the operation of T310 or T312, T310 or T312 is stopped. At this time, the UE collects a start time of T310, the connection problem timer set for the UE, an ID of the UE in the source cell, relevant measurement information, the identification information about the source cell, the identification information about the target cell, identification information about a cell to which the UE is instructed by a first handover command to hand over, and the identification information about the cell where the connection problem occurs. The UE reports the collected information to the cell to which the UE is to hand over (i.e., the cell to which the UE is instructed by the first handover command to hand over), and the cell to which the UE is to hand over determines the MRO critical scenario in accordance with the collected information.

When the source cell and the target cell belong to a same system, the cell to which the UE is instructed by the first handover command to hand over is the source cell, and the duration of the connection problem timer set for the UE is smaller than or equal to a preconfigured target threshold, the MRO critical scenario is determined as the intra-system too early handover critical scenario.

When the source cell and the target cell belong to a same system, the cell to which the UE is instructed by the first handover command to hand over is a cell other than the source cell, and the duration of the connection problem timer set for the UE is smaller than or equal to the preconfigured target threshold, the MRO critical scenario is determined as the intra-system handover to wrong cell critical scenario.

In addition, upon the receipt of the information collected by the UE, the cell to which the UE is to hand over determines whether the cell where the connection problem occurs is the same as a current cell. When the cell where the connection problem occurs is the target cell, the collected information is transmitted to the target cell. Upon the receipt of the collected information, the target cell may determine whether the identification information about the cell where the connection problem occurs in the collected information is the same as the identification information about the current cell. When the identification information about the cell where the connection problem occurs in the collected information is the same as the identification information about the current cell, the MRO critical scenario is determined. When the cell to which the UE is to hand over is the source cell and the target cell determines that the MRO critical scenario is the intra-system too early handover critical scenario, the target cell transmits the determination result indicating that the MRO critical scenario is the intra-system too early handover critical scenario as well as the information collected by the UE to the source cell. When the cell to which the UE is to hand over is a cell other than the source cell and the target cell determines that the MRO critical scenario is the intra-system handover to wrong cell critical scenario, the target cell transmits the determination result indicating that the MRO critical scenario is the intra-system handover to wrong cell critical scenario, the identification information about the cell to which the UE is to hand over as well as the information collected by the UE to the source cell.

Here, it should be appreciated that, in the intra-system too early handover critical scenario, although the cell where the connection problem occurs is the target cell, a basic cause for the connection problem lies in that the handover parameter of the source cell is inappropriate. Hence, in this scenario, the target cell transmits the determination result indicating that the MRO critical scenario is the intra-system too early handover critical scenario as well as the information collected by the UE to the source cell (i.e., the cell where the parameter needs to be adjusted), so that the source cell adjusts the parameter to solve the connection problem.

Identically, in the intra-system handover to wrong cell critical scenario, the cell where the connection problem occurs is the target cell, but a basic cause for the connection problem lies in that the handover parameter of the source cell is inappropriate. Hence, in this scenario, the target cell needs to transmit the determination result indicating that the MRO critical scenario is the intra-system handover to wrong cell critical scenario, the identification information about the cell to which the UE is to hand over as well as the information collected by the UE to the source cell, so that the source cell adjusts the parameter to solve the connection problem.

Third Embodiment

When the connection problem is that T310 is started but not expired, the connection problem timer set for the UE is a time from the last handover initialization to a time point when T310 is stopped.

In a first scenario as shown in FIG. 5, the information collected by the UE and the transmission of the collected information are the same as those mentioned in the first embodiment. When the source cell is an NG-RAN node, the target cell to hand over is an E-UTRAN node, and there is no connection problem timer set for the UE or the duration of the connection problem timer is greater than a preconfigured target threshold, the MRO critical scenario is determined as the inter-system too late handover critical scenario.

In a second scenario as shown in FIG. 5, the information collected by the UE and the transmission of the collected information are the same as those mentioned in the first embodiment. When the source cell is the E-UTRAN node, the target cell to hand over successfully is the NG-RAN node, and the duration of the connection problem timer set for the UE is smaller than or equal to the preconfigured target threshold, the MRO critical scenario is determined as the inter-system too early handover critical scenario.

Fourth Embodiment

In the CHO scenario, a respective one connection problem timer is set for each of the source cell and the target cell. When the connection problem is that T310 is started but not expired, the duration of the connection problem timer set for the source cell is a duration from a time point when the last handover initialization is performed by the UE in the source cell (i.e., a time point when the UE previously receives the handover command instructing the UE to hand over to the source cell from the other cell) to a time point when T310 is stopped, and the duration of the connection problem timer set for the target cell is a duration from the time point when the last handover initialization is performed by the UE in the target cell (i.e., a time point when the UE previously receives the handover command instructing the UE to hand over to the source cell from the other cell) to a time point when T310 is stopped.

Figure 8:
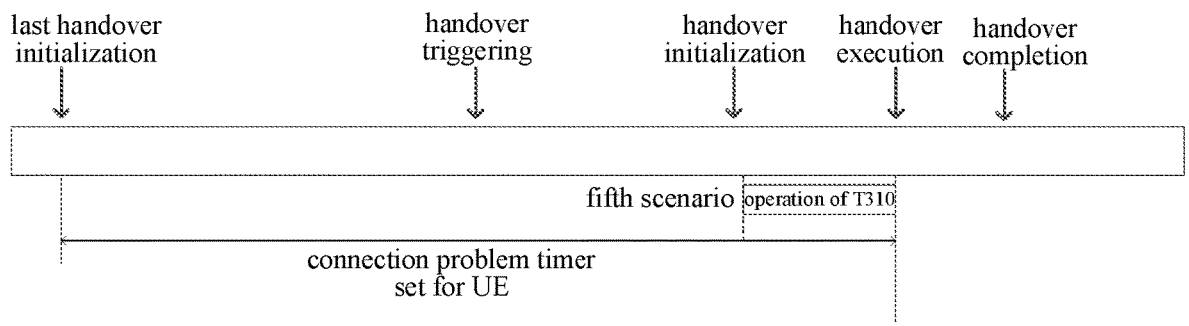
FIG. 8 is still yet another schematic view showing the MRO critical scenario according to an embodiment of the present disclosure.

In a fifth scenario as shown in FIG. 8, after the handover initialization (i.e., after the UE has received the second handover command instructing the UE to hand over to the target cell from the source cell), the UE still maintains its connection with the source cell. The UE may start T310 in the source cell, and stop T310 when the handover is performed. At this time, the UE may collect a start time of T310, the duration of the connection problem timer set for the source cell, an ID of the UE in the source cell, relevant measurement information, the identification information about the source cell, the identification information about the target cell and the identification information about the cell where the connection problem occurs. The UE transmits the collected information to the target cell, and the target cell determines the MRO critical scenario in accordance with the collected information. When there is no connection problem timer set for the source cell or the duration of the connection problem timer is greater than the preconfigured target threshold, the MRO critical scenario is determined as the intra-system too late CHO critical scenario.

Upon the receipt of the information collected by the UE, the target cell determines whether the identification information about the cell where the connection problem occurs is the same as the identification information about the current cell. When the identification information about the cell where the connection problem occurs is different from the identification information about the current cell, the target cell transmits the information collected by the UE to the source cell, so that the source cell where the connection problem occurs determines the MRO critical scenario in accordance with the information collected by the UE.

It should be further appreciated that, in this embodiment, T310 is started in the source cell, i.e., the connection problem is a connection problem between the UE and the source cell. At this time, the information collected by the UE should include the duration of the connection problem timer set for the source cell.

Fifth Embodiment

In the DAPS HO scenario, a respective one connection problem timer is set for each of the source cell and the target cell. When the connection problem is that T310 is started in the source cell but not expired or T310 is started in the source cell and expired, the duration of the connection problem timer set for the source cell is a duration from a time point when the last handover initialization is performed by the UE in the source cell (i.e., a time point when the UE previously receives the handover command instructing the UE to hand over to the source cell from the other cell) to a time point when T310 is stopped or expired, and the duration of the connection problem timer set for the target cell is a duration from the time point when the last handover initialization is performed by the UE in the target cell (i.e., a time point when the UE previously receives the handover command instructing the UE to hand over to the source cell from the other cell) to the time point when T310 is stopped or expired.

Figure 9:
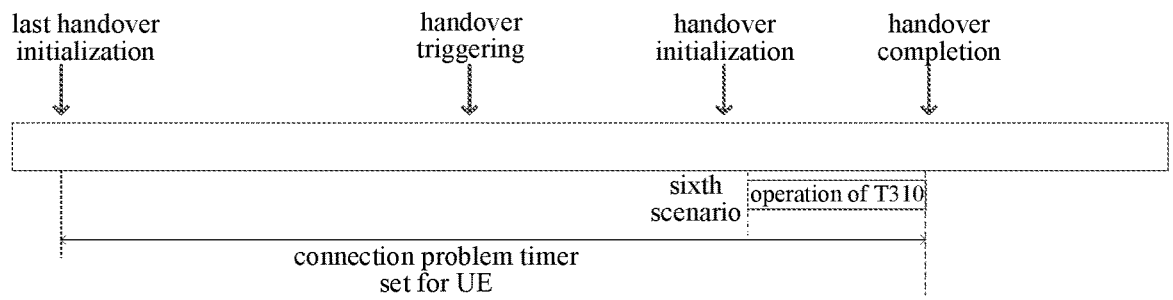
FIG. 9 is still yet another schematic view showing the MRO critical scenario according to an embodiment of the present disclosure.

In a sixth scenario as shown in FIG. 9, after the handover initialization (i.e., after the UE has received the second handover command instructing the UE to hand over to the target cell from the source cell), the UE still maintains its connection with the source cell. The UE may start T310 in the source cell, and stop T310 when the handover is completed. At this time, the UE collects a start time of T310, the duration of the connection problem timer set for the source cell, an ID of the UE in the source cell, relevant measurement information, the identification information about the source cell, the identification information about the target cell and the identification information about the cell where the connection problem occurs. The UE transmits the information collected by the UE to the target cell, and the target cell determines the MRO critical scenario in accordance with the information collected by the UE. When there is no connection problem timer set for the source cell or the duration of the connection problem timer is greater than the preconfigured target threshold, the MRO critical scenario is determined as the intra-system too late DAPS HO critical scenario.

Upon the receipt of the information collected by the UE, the target cell determines whether the identification information that is included in the information collected by the UE and about the cell where the connection problem occurs is the same as the identification information about the current cell. When the identification information that is included in the information collected by the UE and about the cell where the connection problem occurs is different from the identification information about the current cell, the target cell transmits the information collected by the UE to the source cell, so that the source cell where the connection problem occurs determines the MRO critical scenario in accordance with the information collected by the UE.

It should be appreciated that, in this embodiment, T310 is started in the source cell, i.e., the connection problem is a connection problem between the UE and the source cell. At this time, the information collected by the UE should include the duration of the connection problem timer set for the source cell.

In addition, it should be further appreciated that, in the CHO scenario and the DAPS HO scenario, upon the receipt of the second handover command instructing the UE to hand over to the target cell from the source cell, the UE still maintains its connection with the source cell within a certain time period. Hence, in the CHO scenario and the DAPS HO scenario, after the UE has received the second handover command, the connection problem between the UE and the source cell may still be detected, and when the duration of the connection problem timer set for the source cell is smaller than the preconfigured target threshold, the intra-system too late CHO critical scenario or the intra-system too late DAPS HO critical scenario may occur. The intra-system too late CHO critical scenario is a special critical scenario in the CHO scenario, and the intra-system too late DAPS HO critical scenario is a special critical scenario in the DAPS HO scenario.

In addition, the critical scenarios mentioned in the first to third embodiments may also occur in the CHO scenario and the DAPS HO scenario.

According to the embodiments of the present disclosure, in the scenario where the handover is performed successfully, the UE collects the relevant information about the connection problem that occurs and reports it to the network device, so that the network device may determine the MRO critical scenario and adjust the handover parameter in accordance with the determination result. As a result, it is able to further enhance the mobility robustness.

The above description relates to the method for determining the MRO critical scenario, and a device for determining the MRO critical scenario will be described hereinafter in conjunction with the drawings.

Figure 10:
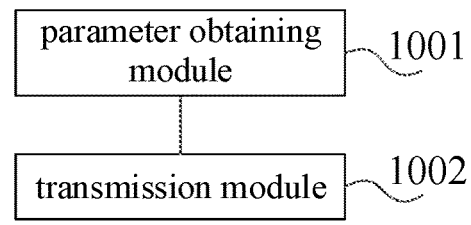
FIG. 10 is a block diagram of a device for determining an MRO critical scenario for a UE according to an embodiment of the present disclosure.

As shown in FIG. 10, the present disclosure further provides in some embodiments a device for determining an MRO critical scenario for a UE, which includes: a parameter obtaining module 1001 configured to obtain parameter information about a connection problem in the case that the connection problem has been detected by the UE in a cell handover process and cell handover has been performed successfully, or in the case that the connection problem has been detected by the UE within a predetermined time period after the cell handover is performed successfully; and a transmission module 1002 configured to transmit the parameter information to a network device, so that the network device may determine the MRO critical scenario in accordance with the parameter information.

Optionally, the parameter information includes at least one of: content information about the connection problem; location information about a location of the UE when the connection problem is detected by the UE; identification information about a source cell and identification information about a target cell; identification information about a cell to which the UE is instructed by a first handover command to hand over, the first handover command being transmitted by the target cell to the UE; or identification information about a cell where the connection problem occurs.

Optionally, the connection problem includes that an RLF occurs between the UE and the source cell after a second handover command has been received by the UE in a DAPS handover scenario, the parameter information includes second indication information, the second handover command is transmitted by the source cell and used to instruct the UE to hand over to the target cell, and the second indication information is used to indicate that the RLF occurs between the UE and the source cell.

Optionally, the connection problem includes at least one of: that a T310 timer is started and not expired; that a T312 timer is started and not expired; that the quantity of times of transmitting an MSGA in a random access process is greater than 1 and smaller than a first predetermined value, the MSGA being a message transmitted by the UE in a two-step random access process; that the quantity of times of transmitting an random access preamble sequence in the random access process is greater than 1 and smaller than a second predetermined value; that the random access process is successfully triggered by a beam failure recovery process; that an RLC protocol is retransmitted and the quantity of times of retransmitting the RLC protocol is smaller than a third predetermined value; or that an MAC layer has received a bottom-layer LBT failure indication, and the quantity of times of continuously receiving the LBT failure indication is smaller than a fourth predetermined value.

Optionally, when the connection problem occurs at the UE and a cell serving the UE belongs to a 5G IAB node, the parameter information includes first indication information, and the first indication information is used to indicate that the connection problem occurs at the 5G IAB node or the connection problem is a backhaul connection problem.

Optionally, the parameter information includes a duration of a connection problem timer, and the duration of the connection problem timer is a duration from a time point when last handover initialization is performed by the UE to a time point when the connection problem is detected, or a duration from the time point when the last handover initialization is performed by the UE to a time point when the connection problem is ended.

Optionally, the parameter information further includes at least one of: content information about the connection problem; location information about a location of the UE when the connection problem is detected by the UE by the UE; identification information about a source cell and identification information about a target cell; identification information about a cell to which the UE is instructed by a first handover command to hand over, the first handover command being transmitted by the target cell to the UE; or identification information about a cell where the connection problem occurs.

Optionally, in a conditional handover scenario or a DAPS handover scenario, a connection problem timer is set for each cell, and the cell is a source cell or a target cell in the cell handover process. In the case that the connection problem is a connection problem between the UE and the source cell, the duration of the connection problem timer in the parameter information is a duration of the connection problem timer set for the source cell. In the case that the connection problem is a connection problem between the UE and the target cell, the duration of the connection problem timer in the parameter information is a duration of the connection problem timer set for the target cell. The duration of the connection problem timer set for the source cell is a duration from a time point when last handover initialization is performed by the UE in the source cell to a time point when the connection problem is detected, or a duration from the time point when the last handover initialization is performed by the UE in the source cell to a time point when the connection problem is ended. The duration of the connection problem timer set for the target cell is a duration from a time point when last handover initialization is performed by the UE in the target cell to the time point when the connection problem is detected, or a duration from the time point when the last handover initialization is performed by the UE in the target cell to the time point when the connection problem is ended.

Optionally, the connection problem further includes that an RLF occurs between the UE and the source cell after a second handover command has been received by the UE in a DAPS handover scenario, the parameter information further includes second indication information, the second handover command is a handover command transmitted by the source cell for indicating the UE to hand over to the target cell, and the second indication information is used to indicate that the RLF occurs between the UE and the source cell.

Figure 11:
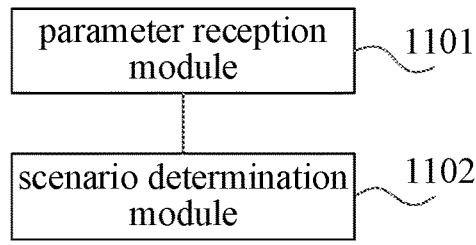
FIG. 11 is a block diagram of a device for determining an MRO critical scenario for a network device according to an embodiment of the present disclosure.

As shown in FIG. 11, the present disclosure further provides in some embodiments a device for determining an MRO critical scenario for a network device, which includes: a parameter reception module 1101 configured to receive parameter information about a connection problem from a UE, the parameter information being obtained in the case that the connection problem has been detected by the UE in a cell handover process and cell handover has been performed successfully, or in the case that the connection problem has been detected by the UE within a predetermined time period after the cell handover is performed successfully; and a scenario determination module 1102 configured to determine the MRO critical scenario in accordance with the parameter information, and obtain a determination result of the MRO critical scenario.

Optionally, the parameter information includes at least one of: content information about the connection problem; location information about a location of the UE when the connection problem is detected by the UE; identification information about a source cell and identification information about a target cell; identification information about a cell to which the UE is instructed by a first handover command to hand over, the first handover command being transmitted by the target cell to the UE; or identification information about a cell where the connection problem occurs.

Optionally, the connection problem includes that an RLF occurs between the UE and the source cell after a second handover command has been received by the UE in a DAPS handover scenario, the parameter information includes second indication information, the second handover command is transmitted by the source cell and used to instruct the UE to hand over to the target cell, and the second indication information is used to indicate that the RLF occurs between the UE and the source cell.

Optionally, the connection problem includes at least one of: that a T310 timer is started and not expired; that a T312 timer is started and not expired; that the quantity of times of transmitting an MSGA in a random access process is greater than 1 and smaller than a first predetermined value, the MSGA being a message transmitted by the UE in a two-step random access process; that the quantity of times of transmitting an random access preamble sequence in the random access process is greater than 1 and smaller than a second predetermined value; that the random access process is successfully triggered by a beam failure recovery process; that an RLC protocol is retransmitted and the quantity of times of retransmitting the RLC protocol is smaller than a third predetermined value; or that an MAC layer has received a bottom-layer LBT failure indication, and the quantity of times of continuously receiving the LBT failure indication is smaller than a fourth predetermined value.

Optionally, when the connection problem occurs at the UE and a cell serving the UE belongs to a 5G IAB node, the parameter information includes first indication information, and the first indication information is used to indicate that the connection problem occurs at the 5G IAB node or the connection problem is a backhaul connection problem. The device further includes a problem determination module configured to determine that the connection problem occurs at the 5G IAB node or the connection problem is the backhaul connection problem in accordance with the first indication information.

Optionally, the parameter information includes a duration of a connection problem timer, and the duration of the connection problem timer is a duration from a time point when last handover initialization is performed by the UE to a time point when the connection problem is detected, or a duration from the time point when the last handover initialization is performed by the UE to a time point when the connection problem is ended.

Optionally, the parameter information further includes at least one of: content information about the connection problem; location information about a location of the UE when the connection problem is detected by the UE by the UE; identification information about a source cell and identification information about a target cell; identification information about a cell to which the UE is instructed by a first handover command to hand over, the first handover command being transmitted by the target cell to the UE; or identification information about a cell where the connection problem occurs.

Optionally, in a conditional handover scenario or a DAPS handover scenario, a connection problem timer is set for each cell, and the cell is a source cell or a target cell in the cell handover process. In the case that the connection problem is a connection problem between the UE and the source cell, the duration of the connection problem timer in the parameter information is a duration of the connection problem timer set for the source cell. In the case that the connection problem is a connection problem between the UE and the target cell, the duration of the connection problem timer in the parameter information is a duration of the connection problem timer set for the target cell. The duration of the connection problem timer set for the source cell is a duration from a time point when last handover initialization is performed by the UE in the source cell to a time point when the connection problem is detected, or a duration from the time point when the last handover initialization is performed by the UE in the source cell to a time point when the connection problem is ended. The duration of the connection problem timer set for the target cell is a duration from a time point when last handover initialization is performed by the UE in the target cell to the time point when the connection problem is detected, or a duration from the time point when the last handover initialization is performed by the UE in the target cell to the time point when the connection problem is ended.

Optionally, the connection problem further includes that an RLF occurs between the UE and the source cell after a second handover command has been received by the UE in a DAPS handover scenario, the parameter information further includes second indication information, the second handover command is a handover command transmitted by the source cell for indicating the UE to hand over to the target cell, and the second indication information is used to indicate that the RLF occurs between the UE and the source cell.

Optionally, the network device is a cell where the connection problem occurs; or when the network device is not the cell where the connection problem occurs, the device further includes a first information transmission module configured to transmit the parameter information to the cell where the connection problem occurs.

Optionally, the MRO critical scenario is at least one of an intra-system too late handover critical scenario, an intra-system too early handover critical scenario, an intra-system handover to wrong cell critical scenario, an inter-system too late handover critical scenario, or an inter-system too early handover critical scenario.

Optionally, in the case that the MRO critical scenario is one of the inter-system too early handover critical scenario or the intra-system too early handover critical scenario, the device further includes a second information transmission module configured to transmit the determination result of the MRO critical scenario and the parameter information to a cell where a parameter needs to be adjusted.

Optionally, in the case that the MRO critical scenario is the intra-system handover to wrong cell critical scenario, the device further includes a third information transmission module configured to transmit the determination result of the MRO critical scenario, the parameter information and identification information about a cell to which the UE is instructed by a first handover command to hand over to a cell where a parameter needs to be adjusted. The first handover command is a handover command transmitted by the target cell to the UE.

It should be appreciated that, the units in the embodiments of the present disclosure are for illustrative purposes, and they are provided merely on the basis of their logic functions. The units may be integrated in a processing unit, or physically separated from each other, or two or more units may be integrated in one unit. The integrated units may be implemented in the form of hardware or a software functional unit.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be appreciated that, the device in the embodiments of the present disclosure is used to implement all the steps of the above-mentioned method with a same technical effect, which will not be further particularly defined herein.

The present disclosure further provides in some embodiments a system for determining an MRO critical scenario, which includes the above-mentioned UE and network device.

Figure 12:
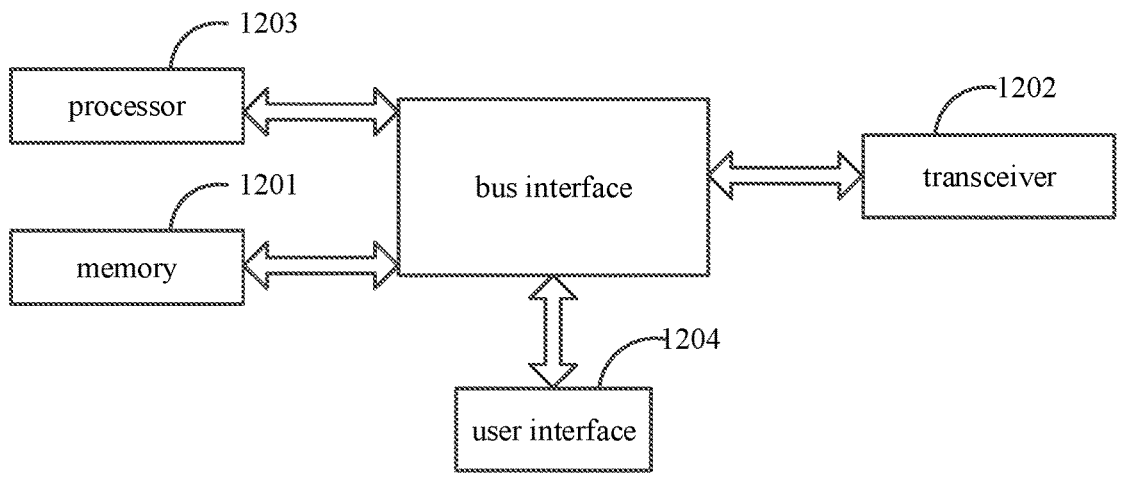
FIG. 12 is a block diagram of the UE according to an embodiment of the present disclosure.

The present disclosure further provides in some embodiments a UE which, as shown in FIG. 12, includes a memory 1201, a transceiver 1202 and a processor 1203. The memory 1201 is configured to store therein a computer program. The transceiver 1202 is configured to receive and transmit data under the control of the processor 1203. The processor 1203 is configured to read the computer program in the memory 1201, so as to: obtain parameter information about a connection problem in the case that the connection problem has been detected by the UE in a cell handover process and cell handover has been performed successfully, or in the case that the connection problem has been detected by the UE within a predetermined time period after the cell handover is performed successfully; and transmit through the transceiver 1202 the parameter information to a network device, so that the network device may determine the MRO critical scenario in accordance with the parameter information.

Optionally, the parameter information includes at least one of: content information about the connection problem; location information about a location of the UE when the connection problem is detected by the UE; identification information about a source cell and identification information about a target cell; identification information about a cell to which the UE is instructed by a first handover command to hand over, the first handover command being transmitted by the target cell to the UE; or identification information about a cell where the connection problem occurs.

Optionally, the connection problem includes that an RLF occurs between the UE and the source cell after a second handover command has been received by the UE in a DAPS handover scenario, the parameter information includes second indication information, the second handover command is transmitted by the source cell and used to instruct the UE to hand over to the target cell, and the second indication information is used to indicate that the RLF occurs between the UE and the source cell.

Optionally, the connection problem includes at least one of: that a T310 timer is started and not expired; that a T312 timer is started and not expired; that the quantity of times of transmitting an MSGA in a random access process is greater than 1 and smaller than a first predetermined value, the MSGA being a message transmitted by the UE in a two-step random access process; that the quantity of times of transmitting an random access preamble sequence in the random access process is greater than 1 and smaller than a second predetermined value; that the random access process is successfully triggered by a beam failure recovery process; that an RLC protocol is retransmitted and the quantity of times of retransmitting the RLC protocol is smaller than a third predetermined value; or that an MAC layer has received a bottom-layer LBT failure indication, and the quantity of times of continuously receiving the LBT failure indication is smaller than a fourth predetermined value.

Optionally, when the connection problem occurs at the UE and a cell serving the UE belongs to a 5G IAB node, the parameter information includes first indication information, and the first indication information is used to indicate that the connection problem occurs at the 5G IAB node or the connection problem is a backhaul connection problem.

Optionally, the parameter information includes a duration of a connection problem timer, and the duration of the connection problem timer is a duration from a time point when last handover initialization is performed by the UE to a time point when the connection problem is detected, or a duration from the time point when the last handover initialization is performed by the UE to a time point when the connection problem is ended.

Optionally, the parameter information further includes at least one of: content information about the connection problem; location information about a location of the UE when the connection problem is detected by the UE by the UE; identification information about a source cell and identification information about a target cell; identification information about a cell to which the UE is instructed by a first handover command to hand over, the first handover command being transmitted by the target cell to the UE; or identification information about a cell where the connection problem occurs.

Optionally, in a conditional handover scenario or a DAPS handover scenario, a connection problem timer is set for each cell, and the cell is a source cell or a target cell in the cell handover process. In the case that the connection problem is a connection problem between the UE and the source cell, the duration of the connection problem timer in the parameter information is a duration of the connection problem timer set for the source cell. In the case that the connection problem is a connection problem between the UE and the target cell, the duration of the connection problem timer in the parameter information is a duration of the connection problem timer set for the target cell. The duration of the connection problem timer set for the source cell is a duration from a time point when last handover initialization is performed by the UE in the source cell to a time point when the connection problem is detected, or a duration from the time point when the last handover initialization is performed by the UE in the source cell to a time point when the connection problem is ended. The duration of the connection problem timer set for the target cell is a duration from a time point when last handover initialization is performed by the UE in the target cell to the time point when the connection problem is detected, or a duration from the time point when the last handover initialization is performed by the UE in the target cell to the time point when the connection problem is ended.

Optionally, the connection problem further includes that an RLF occurs between the UE and the source cell after a second handover command has been received by the UE in a DAPS handover scenario, the parameter information further includes second indication information, the second handover command is a handover command transmitted by the source cell for indicating the UE to hand over to the target cell, and the second indication information is used to indicate that the RLF occurs between the UE and the source cell.

In FIG. 12, bus architecture may include a number of buses and bridges connected to each other, so as to connect various circuits for one or more processors 1203 and one or more memories 1201. In addition, as is known in the art, the bus architecture may be used to connect any other circuits, such as a circuit for a peripheral device, a circuit for a voltage stabilizer and a power management circuit. A bus interface may be provided, and the transceiver 1202 may consist of a plurality of elements, i.e., a transmitter and a receiver for communication with any other devices over a transmission medium. The transmission medium includes a wireless channel, a wired channel, or an optical cable. With respect to different UEs, a user interface 1204 may also be provided for devices which are to be arranged inside or outside the UE, and these devices may include but not limited to a keypad, a display, a speaker, a microphone and a joystick. The processor 1203 may take charge of managing the bus architecture as well as general processings. The memory 1202 may store therein data for the operation of the processor 1203.

Optionally, the processor 1203 is a Central Processing Unit (CPU), an Application Specific Integrated Circuit (ASIC), a Field-Programmable Gate Array (FPGA) or a Complex Programmable Logic Device (CPLD). The processor may also use multi-core architecture.

The processor is configured to call the program instruction in the memory, so as to implement the above-mentioned method in accordance with obtained executable instructions. The processor may also be physically separated from the memory.

Figure 13:
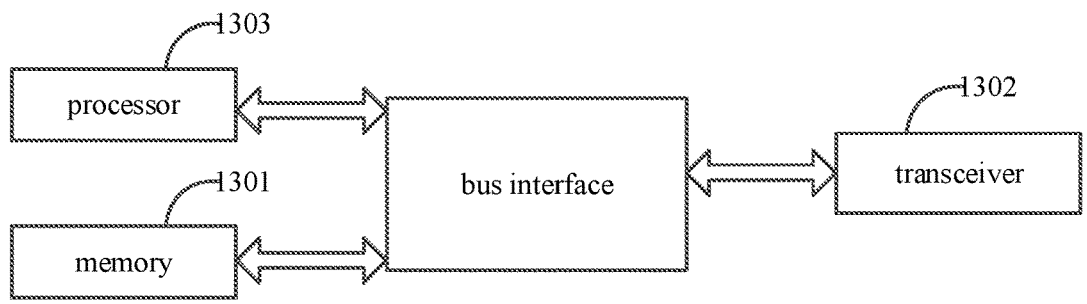
FIG. 13 is a block diagram of the network device according to an embodiment of the present disclosure.

The present disclosure further provides in some embodiments a network device which, as shown in FIG. 13, includes a memory 1301, a transceiver 1302 and a processor 1303. The memory 1301 is configured to store therein a computer program. The transceiver 1302 is configured to transmit and receive data under the control of the processor 1303. The processor 1303 is configured to read the computer program in the memory 1301, so as to: receive through the transceiver 1302 parameter information about a connection problem from a UE, the parameter information being obtained in the case that the connection problem has been detected by the UE in a cell handover process and cell handover has been performed successfully, or in the case that the connection problem has been detected by the UE within a predetermined time period after the cell handover is performed successfully; and determine the MRO critical scenario in accordance with the parameter information, and obtaining a determination result of the MRO critical scenario.

Optionally, the parameter information includes at least one of: content information about the connection problem; location information about a location of the UE when the connection problem is detected by the UE; identification information about a source cell and identification information about a target cell; identification information about a cell to which the UE is instructed by a first handover command to hand over, the first handover command being transmitted by the target cell to the UE; or identification information about a cell where the connection problem occurs.

Optionally, the connection problem includes that an RLF occurs between the UE and the source cell after a second handover command has been received by the UE in a DAPS handover scenario, the parameter information includes second indication information, the second handover command is transmitted by the source cell and used to instruct the UE to hand over to the target cell, and the second indication information is used to indicate that the RLF occurs between the UE and the source cell.

Optionally, the connection problem includes at least one of: that a T310 timer is started and not expired; that a T312 timer is started and not expired; that the quantity of times of transmitting an MSGA in a random access process is greater than 1 and smaller than a first predetermined value, the MSGA being a message transmitted by the UE in a two-step random access process; that the quantity of times of transmitting an random access preamble sequence in the random access process is greater than 1 and smaller than a second predetermined value; that the random access process is successfully triggered by a beam failure recovery process; that an RLC protocol is retransmitted and the quantity of times of retransmitting the RLC protocol is smaller than a third predetermined value; or that an MAC layer has received a bottom-layer LBT failure indication, and the quantity of times of continuously receiving the LBT failure indication is smaller than a fourth predetermined value.

Optionally, when the connection problem occurs at the UE and a cell serving the UE belongs to a 5G IAB node, the parameter information includes first indication information, and the first indication information is used to indicate that the connection problem occurs at the 5G IAB node or the connection problem is a backhaul connection problem. The processor is further configured to determine that the connection problem occurs at the 5G IAB node or the connection problem is the backhaul connection problem in accordance with the first indication information.

Optionally, the parameter information includes a duration of a connection problem timer, and the duration of the connection problem timer is a duration from a time point when last handover initialization is performed by the UE to a time point when the connection problem is detected, or a duration from the time point when the last handover initialization is performed by the UE to a time point when the connection problem is ended.

Optionally, the parameter information further includes at least one of: content information about the connection problem; location information about a location of the UE when the connection problem is detected by the UE by the UE; identification information about a source cell and identification information about a target cell; identification information about a cell to which the UE is instructed by a first handover command to hand over, the first handover command being transmitted by the target cell to the UE; or identification information about a cell where the connection problem occurs.

Optionally, in a conditional handover scenario or a DAPS handover scenario, a connection problem timer is set for each cell, and the cell is a source cell or a target cell in the cell handover process. In the case that the connection problem is a connection problem between the UE and the source cell, the duration of the connection problem timer in the parameter information is a duration of the connection problem timer set for the source cell. In the case that the connection problem is a connection problem between the UE and the target cell, the duration of the connection problem timer in the parameter information is a duration of the connection problem timer set for the target cell. The duration of the connection problem timer set for the source cell is a duration from a time point when last handover initialization is performed by the UE in the source cell to a time point when the connection problem is detected, or a duration from the time point when the last handover initialization is performed by the UE in the source cell to a time point when the connection problem is ended. The duration of the connection problem timer set for the target cell is a duration from a time point when last handover initialization is performed by the UE in the target cell to the time point when the connection problem is detected, or a duration from the time point when the last handover initialization is performed by the UE in the target cell to the time point when the connection problem is ended.

Optionally, the connection problem further includes that an RLF occurs between the UE and the source cell after a second handover command has been received by the UE in a DAPS handover scenario, the parameter information further includes second indication information, the second handover command is a handover command transmitted by the source cell for indicating the UE to hand over to the target cell, and the second indication information is used to indicate that the RLF occurs between the UE and the source cell.

Optionally, the network device is a cell where the connection problem occurs; or when the network device is not the cell where the connection problem occurs, the processor is further configured to transmit the parameter information to the cell where the connection problem occurs.

Optionally, the MRO critical scenario is at least one of an intra-system too late handover critical scenario, an intra-system too early handover critical scenario, an intra-system handover to wrong cell critical scenario, an inter-system too late handover critical scenario, or an inter-system too early handover critical scenario.

Optionally, in the case that the MRO critical scenario is one of the inter-system too early handover critical scenario or the intra-system too early handover critical scenario, the processor is further configured to transmit the determination result of the MRO critical scenario and the parameter information to a cell where a parameter needs to be adjusted.

Optionally, in the case that the MRO critical scenario is the inter-system handover to wrong cell critical scenario, the processor is further configured to transmit the determination result of the MRO critical scenario, the parameter information and identification information about a cell to which the UE is instructed by a first handover command to hand over to a cell where a parameter needs to be adjusted. The first handover command is a handover command transmitted by the target cell to the UE.

In FIG. 13, bus architecture may include a number of buses and bridges connected to each other, so as to connect various circuits for one or more processors 1303 and one or more memories 1301. In addition, as is known in the art, the bus architecture may be used to connect any other circuits, such as a circuit for a peripheral device, a circuit for a voltage stabilizer and a power management circuit. A bus interface may be provided, and the transceiver 1302 may consist of a plurality of elements, i.e., a transmitter and a receiver for communication with any other devices over a transmission medium. The transmission medium includes a wireless channel, a wired channel, or an optical cable. The processor 1303 may take charge of managing the bus architecture as well as general processings. The memory 1301 may store therein data for the operation of the processor 1303.

Optionally, the processor 1303 is a CPU, an ASIC, an FPGA or a CPLD. The processor may also use multi-core architecture.

It should be appreciated that, the device in the embodiments of the present disclosure is used to implement all the steps of the above-mentioned method with a same technical effect, which will not be particularly defined herein.

The present disclosure further provides in some embodiments a processor-readable storage medium storing therein a computer program. The computer program is executed by a processor so as to implement the above-mentioned method for determining the MRO critical scenario.

The processor-readable storage medium may be any available medium or data storage device capable of being accessed by a processor, which includes, but not limited to, a magnetic memory (e.g., floppy disk, hard disk, magnetic tape, or Magnetic Optical disk (MO)), an optical memory (e.g., Compact Disk (CD), Digital Video Disk (DVD), Blue-ray Disk (BD), or High-definition Versatile Disk (HVD)), or a semiconductor memory (e.g., ROM, Electrically Programmable ROM (EPROM), Electrically Erasable PROM (EEPROM), NAND flash, or Solid-State Disk (SSD)).

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to a disk memory and an optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above-mentioned device embodiments are merely for illustrative purposes. The units may be, or may not be, physically separated from each other. The units for displaying may be, or may not be, physical units, i.e., they may be arranged at an identical location, or distributed on a plurality of network elements. Parts or all of the units may be selected in accordance with the practical need, so as to achieve the purpose of the present disclosure. The person skilled in the art may understand and implement these schemes without creative effort.

The members in the embodiments of the present disclosure may be implemented as hardware, or software modules run on one or more processors, or a combination thereof. It should be appreciated that, some or all functions of some or all members in the scheme may be achieved via a microprocessor or a Digital Signal Processor (DSP) in practice. In addition, the scheme in the embodiments of the present disclosure may also be implemented as a device or apparatus program (e.g., a computer program and a computer program product) capable of executing parts or all of the steps of the mentioned method. The program may be stored in a computer-readable medium, or may be provided in the form of one or more signals. The signals may be downloaded from Internet, or acquired from a carrier, or provided in any other form.

Figure 14:
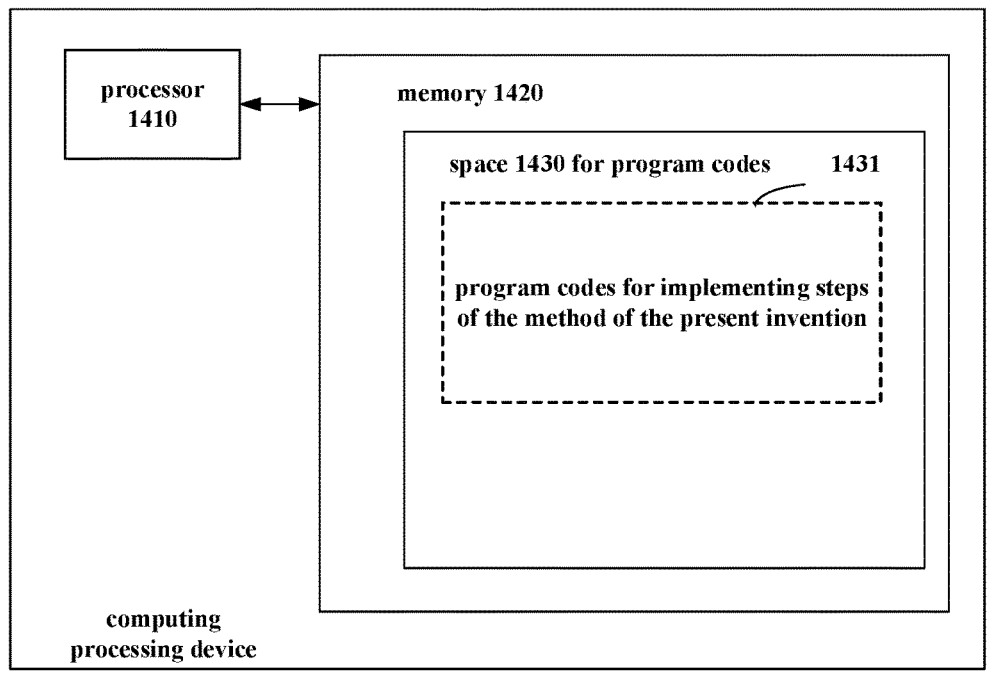
FIG. 14 is a block diagram of a computing processing device for implementing the method according to an embodiment of the present disclosure.
Figure 15:
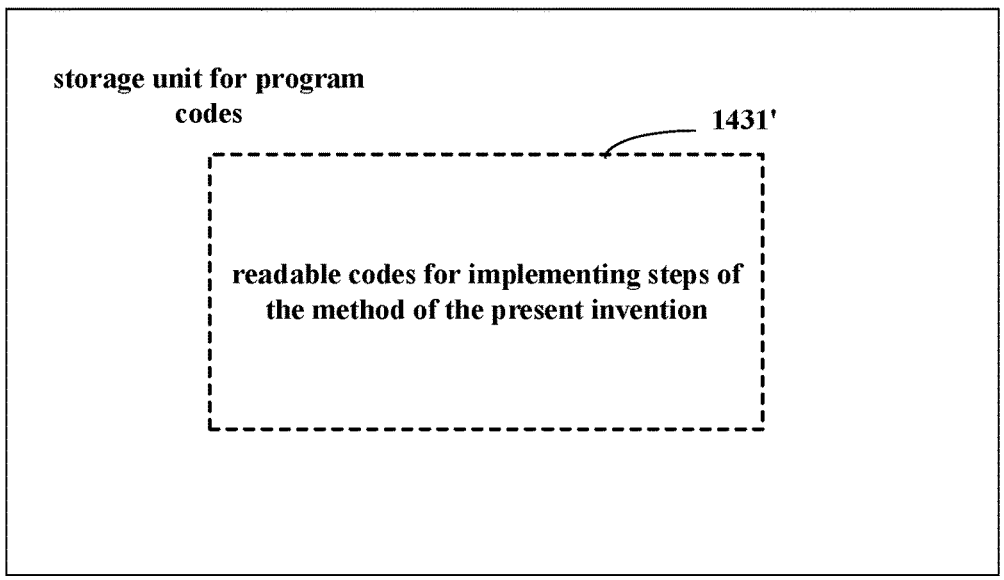
FIG. 15 is a block diagram of a storage unit for maintaining or carrying a program code for implementing the method according to an embodiment of the present disclosure.

For example, FIG. 14 shows a computing processing device for implementing the method in the embodiments of the present disclosure. The computing processing device includes a processor 1410, and a computer program product or a computer-readable medium in the form of a memory 1420. The memory 1420 is a flash memory, an EEPROM, an EPROM, a hard disk or an ROM. The memory 1420 is provided with a storage space 1430 for a program code 1431 for implementing the steps of the above-mentioned information transmission method. For example, the memory space 1430 for the program code includes various program codes 1431 for implementing the steps of the above-mentioned method, and these program codes are read from or written into one or more computer program products. The computer program products include hard disk, CD, memory card or floppy disk. Usually, the computer program product is a portable or immobile memory unit as shown in FIG. 15. The memory unit is provided with a memory section or memory space similar to the memory 1420 in the computing processing device in FIG. 14. The program code is compressed in an appropriate manner. Usually, the memory unit includes computer-readable codes 1431', i.e., codes read by a processor such as the processor 1410. When the codes are executed by the computing processing device, it is able to implement the steps of the above-mentioned method.

In the present disclosure, such phrases as "one embodiment", "embodiments" or "one or more embodiments" intend to indicate that the specific features, structures or characteristics are contained in at least one embodiment of the present disclosure, rather than referring to an identical embodiment.

Although with a large amount of details mentioned hereinabove, the present disclosure may be practiced without these details. In some embodiments of the present disclosure, well-known methods, structures and techniques have not been shown in detail in order not to obscure the understanding of this description.

In the appended claims, any reference numeral in parenthesis shall not be construed as limiting the claims. The word "include" shall not be construed as excluding any other member or component not defined in the claims. The expression "one" or "one of" ahead of a member or component shall not be construed as excluding more than one member or component. The scheme in the present disclosure may be implemented through a device including different members. In the appended claims where several members have been defined, some of these members may be implemented as a same member. The words "first", "second" and "third" shall not be used to represent any order, and these words may be interpreted as nomenclatures.

It should be noted that a person skilled in the art can make various modifications and variations without departing from the spirit and scope of the present disclosure. Therefore, if these modifications and variations fall within the scope of the claims of the present disclosure and their equivalences, the present application is also intended to include these modifications and variations.

What is claimed is:

1. A method for determining a Mobility Robustness Optimization (MRO) critical scenario, performed by a User Equipment (UE) and comprising:
   obtaining parameter information about a connection problem in the case that the connection problem has been detected by the UE in a cell handover process and cell handover has been performed successfully, or in the case that the connection problem has been detected by the UE within a predetermined time period after the cell handover is performed successfully;
   transmitting the parameter information to a network device;
   wherein the parameter information comprises:
   identification information about a cell to which the UE is instructed by a first handover command to hand over, the first handover command being transmitted by a target cell to the UE;
   wherein the connection problem comprising:
   a Radio Link Failure (RLF) occurring between the UE and a source cell after a second handover command has been received by the UE in a Dual Active Protocol Stack (DAPS) handover scenario, wherein the second handover command is transmitted by the source cell and used to instruct the UE to hand over to the target cell,
   wherein the parameter information comprises second indication information, and
   wherein the second indication information is used to indicate that the RLF occurs between the UE and the source cell.

2. The method according to claim 1, wherein the parameter information comprises at least one of:
   content information about the connection problem;
   location information about a location of the UE when the connection problem is detected by the UE;
   identification information about the source cell and identification information about the target cell; or
   identification information about a cell where the connection problem occurs.

3. The method according to claim 1, wherein when the connection problem occurs at the UE, and a cell serving the UE belongs to a $5^{th}$-Generation (5G) Integrated Access and Backhaul (IAB) node, the parameter information comprises first indication information;
   wherein the first indication information is used to indicate that the connection problem occurs at the 5G IAB node or the connection problem is a backhaul connection problem.

4. The method according to claim 1, wherein the parameter information comprises a duration of a connection problem timer, and the duration of the connection problem timer is a duration from a time point when last handover initialization is performed by the UE to a time point when the connection problem is detected, or a duration from the time point when the last handover initialization is performed by the UE to a time point when the connection problem is ended.

5. The method according to claim 4, wherein in a conditional handover scenario or a DAPS handover scenario, a respective connection problem timer is set for each cell, and the each cell is the source cell or the target cell in the cell handover process;
in the case that the connection problem is a connection problem between the UE and the source cell, the duration of the connection problem timer in the parameter information is a duration of the connection problem timer set for the source cell;
in the case that the connection problem is a connection problem between the UE and the target cell, the duration of the connection problem timer in the parameter information is a duration of the connection problem timer set for the target cell;
the duration of the connection problem timer set for the source cell is a duration from a time point when last handover initialization is performed by the UE in the source cell to a time point when the connection problem is detected, or a duration from the time point when the last handover initialization is performed by the UE in the source cell to a time point when the connection problem is ended; or
the duration of the connection problem timer set for the target cell is a duration from a time point when last handover initialization is performed by the UE in the target cell to the time point when the connection problem is detected, or a duration from the time point when the last handover initialization is performed by the UE in the target cell to the time point when the connection problem is ended.

6. The method according to claim 1, wherein the connection problem comprises at least one of:
that a T310 timer is started and not expired;
that a T312 timer is started and not expired;
that the quantity of times of transmitting an MSGA in a random access process is greater than 1 and smaller than a first predetermined value, the MSGA being a message transmitted by the UE in a two-step random access process;
that the quantity of times of transmitting a random access preamble sequence in the random access process is greater than 1 and smaller than a second predetermined value;
that the random access process is successfully triggered by a beam failure recovery process;
that a Radio Link Control (RLC) protocol is retransmitted, and the quantity of times of retransmitting the RLC protocol is smaller than a third predetermined value; or
that a Media Access Control (MAC) layer has received a bottom-layer Listen Before Talk (LBT) failure indication, and the quantity of times of continuously receiving the LBT failure indication is smaller than a fourth predetermined value.

7. A method for determining an MRO critical scenario, performed by a network device and comprising:
receiving parameter information about a connection problem transmitted by a UE, the parameter information being obtained by the UE in the case that the connection problem has been detected by the UE in a cell handover process and cell handover has been performed successfully, or in the case that the connection problem has been detected by the UE within a predetermined time period after the cell handover is performed successfully;
determining the MRO critical scenario in accordance with the parameter information, and obtaining a determination result of the MRO critical scenario;
wherein the parameter information comprises:
identification information about a cell to which the UE is instructed by a first handover command to hand over, the first handover command being transmitted by the target cell to the UE;
wherein the connection problem comprising:
a RLF occurring between the UE and a source cell after a second handover command has been received by the UE in a DAPS handover scenario, wherein the second handover command is transmitted by the source cell and used to instruct the UE to hand over to a target cell,
wherein the parameter information comprises second indication information, and
wherein the second indication information is used to indicate that the RLF occurs between the UE and the source cell.

8. The method according to claim 7, wherein the parameter information comprises at least one of:
content information about the connection problem;
location information about a location of the UE when the connection problem is detected by the UE;
identification information about the source cell and identification information about the target cell; or
identification information about a cell where the connection problem occurs.

9. The method according to claim 7, wherein the parameter information comprises a duration of a connection problem timer, and the duration of the connection problem timer is a duration from a time point when last handover initialization is performed by the UE to a time point when the connection problem is detected, or a duration from the time point when the last handover initialization is performed by the UE to a time point when the connection problem is ended.

10. The method according to claim 9, wherein in a conditional handover scenario or a DAPS handover scenario, a respective connection problem timer is set for each cell, and the each cell is the source cell or the target cell in the cell handover process;
in the case that the connection problem is a connection problem between the UE and the source cell, the duration of the connection problem timer in the parameter information is a duration of the connection problem timer set for the source cell;
in the case that the connection problem is a connection problem between the UE and the target cell, the duration of the connection problem timer in the parameter information is a duration of the connection problem timer set for the target cell;
the duration of the connection problem timer set for the source cell is a duration from a time point when last handover initialization is performed by the UE in the source cell to a time point when the connection problem is detected, or a duration from the time point when the last handover initialization is performed by the UE in the source cell to a time point when the connection problem is ended; or the duration of the connection problem timer set for the target cell is a duration from a time point when last handover initialization is performed by the UE in the target cell to the time point when the connection problem is detected, or a duration from the time point when the last handover initialization is performed by the UE in the target cell to the time point when the connection problem is ended.

11. The method according to claim 7, wherein
the network device is a cell where the connection problem occurs;
or
when the network device is not the cell where the connection problem occurs, the method further comprises:
transmitting the parameter information to the cell where the connection problem occurs.

12. The method according to claim 7, wherein the MRO critical scenario is at least one of:
an inter-system too late handover critical scenario, an inter-system too early handover critical scenario, an inter-system handover to wrong cell critical scenario, an intra-system too late handover critical scenario, or an intra-system too early handover critical scenario.

13. The method according to claim 12, wherein in the case that the MRO critical scenario is one of the intra-system too early handover critical scenario or the inter-system too early handover critical scenario, the method further comprises:
transmitting the determination result of the MRO critical scenario and the parameter information to a cell where a parameter needs to be adjusted.

14. The method according to claim 12, wherein in the case that the MRO critical scenario is the intra-system handover to wrong cell critical scenario, the method further comprises:
transmitting, to a cell where a parameter needs to be adjusted, the determination result of the MRO critical scenario, the parameter information, and identification information about a cell to which the UE is instructed by a first handover command to hand over,
wherein the first handover command is a handover command transmitted by the target cell to the UE.

15. The method according to claim 7, wherein the connection problem comprises at least one of:
that a T310 timer is started and not expired;
that a T312 timer is started and not expired;
that the quantity of times of transmitting an MSGA in a random access process is greater than 1 and smaller than a first predetermined value, the MSGA being a message transmitted by the UE in a two-step random access process;
that the quantity of times of transmitting a random access preamble sequence in the random access process is greater than 1 and smaller than a second predetermined value;
that the random access process is successfully triggered by a beam failure recovery process;
that a RLC protocol is retransmitted, and the quantity of times of retransmitting the RLC protocol is smaller than a third predetermined value; or
that a MAC layer has received a bottom-layer LBT failure indication, and the quantity of times of continuously receiving the LBT failure indication is smaller than a fourth predetermined value.

16. A UE, comprising a memory, a transceiver and a processor, wherein
the memory is configured to store therein a computer program, the transceiver is configured to transmit and receive data under control of the processor, and the processor is configured to read the computer program in the memory to:
obtain parameter information about a connection problem in the case that the connection problem has been detected in a cell handover process and cell handover has been performed successfully, or in the case that the connection problem has been detected within a predetermined time period after the cell handover is performed successfully;
control the transceiver to transmit the parameter information to a network device;
wherein the parameter information comprises:
identification information about a cell to which the UE is instructed by a first handover command to hand over, the first handover command being transmitted by a target cell to the UE;
wherein the connection problem comprising:
a RLF occurring between the UE and a source cell after a second handover command has been received by the UE in a DAPS handover scenario, wherein the second handover command is transmitted by the source cell and used to instruct the UE to hand over to the target cell,
wherein the parameter information comprises second indication information, and
wherein the second indication information is used to indicate that the RLF occurs between the UE and the source cell.

17. The UE according to claim 16, wherein the parameter information comprises at least one of:
content information about the connection problem;
location information about a location of the UE when the connection problem is detected by the UE;
identification information about the source cell and identification information about the target cell; or
identification information about a cell where the connection problem occurs.

18. The UE according to claim 16, wherein the connection problem comprises at least one of:
that a T310 timer is started and not expired;
that a T312 timer is started and not expired;
that the quantity of times of transmitting an MSGA in a random access process is greater than 1 and smaller than a first predetermined value, the MSGA being a message transmitted by the UE in a two-step random access process;
that the quantity of times of transmitting a random access preamble sequence in the random access process is greater than 1 and smaller than a second predetermined value;
that the random access process is successfully triggered by a beam failure recovery process;
that a RLC protocol is retransmitted, and the quantity of times of retransmitting the RLC protocol is smaller than a third predetermined value; or
that a MAC layer has received a bottom-layer LBT failure indication, and the quantity of times of continuously receiving the LBT failure indication is smaller than a fourth predetermined value.

19. A network device, comprising a memory, a transceiver and a processor, wherein
the memory is configured to store therein a computer program, the transceiver is configured to transmit and receive data under control of the processor, and the processor is configured to read the computer program in the memory to implement the method according to claim 7.

20. The network device according to claim 19, wherein the parameter information comprises at least one of:
content information about the connection problem;
location information about a location of the UE when the connection problem is detected by the UE;
identification information about the source cell and identification information about the target cell; or
identification information about a cell where the connection problem occurs.

* * * * *